(12) United States Patent
Komazawa et al.

(10) Patent No.: US 6,408,807 B1
(45) Date of Patent: Jun. 25, 2002

(54) VARIABLE VALVE TIMING SYSTEM

(75) Inventors: Osamu Komazawa, Chita; Kazumi Ogawa, Toyota; Yoji Kanada, Gamagori, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/920,646

(22) Filed: Aug. 3, 2001

(30) Foreign Application Priority Data

Aug. 3, 2000 (JP) .................................. 2000-236010
May 25, 2001 (JP) .................................. 2001-157080

(51) Int. Cl.$^7$ ................................. F01L 1/34
(52) U.S. Cl. ........................ 123/90.17; 123/90.15
(58) Field of Search .................... 123/90.15, 90.16, 123/90.17, 90.18, 90.31

(56) References Cited

U.S. PATENT DOCUMENTS

| | | | | |
|---|---|---|---|---|
| 5,628,286 A | * | 5/1997 | Kato et al. ............... | 123/90.15 |
| 6,209,497 B1 | * | 4/2001 | Niethammer et al. ..... | 123/90.17 |
| 6,260,524 B1 | * | 7/2001 | Wachi ..................... | 123/90.15 |

FOREIGN PATENT DOCUMENTS

JP         09-324613 A    12/1997

* cited by examiner

*Primary Examiner*—Weilun Lo
(74) *Attorney, Agent, or Firm*—Burns, Doane, Swecker & Mathis, LLP

(57) ABSTRACT

A variable valve timing system includes a hydraulic pressure circuit for controlling an operation fluid supply/discharge of the relative rotation controlling mechanism and for controlling an operation fluid supply/discharge of each of the advanced angle chamber and the retarded angle chamber. The hydraulic pressure circuit, upon initiation of the internal combustion engine, discharges the operation fluid from the relative rotation controlling mechanism and the advanced and retarded angle chambers until a pressure of the operation fluid reaches a controllable pressure value. The hydraulic pressure circuit, after the pressure of the operation fluid reaches the controllable pressure value, effecting filling of one of the advanced and retarded angle chambers which is at the superior side of in phase transfer response with operation fluid, subsequently effecting filling of the other of the advanced and retarded angle chambers, and being adapted to supply the operation fluid to the relative rotation controlling mechanism.

14 Claims, 13 Drawing Sheets

VARIABLE VALVE TIMING SYSTEM

The present application is based on and claims under 35 U.S.C. § 119 with respect to Japanese Patent Application No. 2000-236010 filed on Aug. 3, 2000 and Japanese Patent Application No. 2001-157080 filed on May 25, 2001, the entire content of both of which is incorporated herein by reference.

FIELD OF THE INVENTION

The present invention generally relates to variable valve timing systems. More particularly, the present invention pertains to a variable valve timing system for controlling the opening and closing time of an intake valve and an exhaust valve of a vehicle-mounted internal combustion engine.

BACKGROUND OF THE INVENTION

A known variable valve timing system is described in Japanese Patent Laid-Open Publication No. Hei. 09(1997)-324613. The disclosed variable valve timing system includes a housing member disposed in the driving force transmitting system for transmitting the driving force from the crankshaft of the combustion engine to the camshaft for controlling the opening and closing of either one of the intake valve and the exhaust valve of the combustion engine. The housing member rotates as a unit with one of the crankshaft and the camshaft.

The variable valve timing system also includes a rotor member rotatably assembled on a shoe portion provided on the housing member. The rotor member forms an advanced angle chamber and a retarded angle chamber at a vane portion in the housing member and integrally rotates with one of the camshaft and the crankshaft.

The variable valve timing system further includes a relative rotation controlling mechanism. The relative rotation controlling mechanism allows the relative rotation of the housing member and the rotor member by an unlock operation by the supply of an operation fluid. The relative rotation controlling mechanism restricts the relative rotation of the housing member and the rotor member at an intermediate angle phase between a retarded angle phase and an advanced angle phase by a lock operation by the discharge of the operation fluid. The variable valve timing system still further includes a hydraulic pressure circuit for controlling the supply and discharge of the operation fluid to the relative rotation controlling mechanism as well as for controlling the supply and discharge of the operation fluid to the advanced angle chamber and the retarded angle chamber.

In the aforementioned variable valve timing system, to make the internal combustion engine start in a smooth manner, the open/close timing of one of the intake valve and the exhaust valve is set, under the condition that the relative rotation controlling mechanism restricts the relative rotation between the housing member and the rotor member at a lock phase position within an intermediate region which is located at a position other than the rotation limit ends corresponding to the advanced and retarded angle phase positions, respectively. Thus, at the initial stage of the internal combustion engine, if such the restriction at the lock phase position is not performed, the starting ability of the internal combustion engine may become worse.

With respect to the relative rotation controlling mechanism which restricts the relative rotation between the rotor member and the housing member at the lock phase position, the restriction may be inhibited due to the design of the hydraulic pressure circuit and/or the remaining operation fluid in at least one of the relative rotation controlling mechanism, the advanced angle chamber, and the retarded angle chamber. In addition, in the conventional hydraulic pressure circuit, no consideration has been made as to how to control a hydraulic control pressure valve, which is connected into the hydraulic pressure circuit, upon initiation of the internal combustion engine. This results in the relative rotation phase between the housing member and the rotor member becoming unstable temporally when the internal combustion engine is transferred from its initiation to steady operation condition.

Thus, a need exists for a variable valve timing system for overcoming the aforementioned drawbacks.

SUMMARY OF THE INVENTION

In accordance with an aspect of the present invention, a variable valve timing system includes a housing member provided in a driving force transmitting system in which is transmitted a driving force from a crankshaft of an internal combustion engine to a camshaft for controlling opening/closing of one of an intake valve and an exhaust valve of the internal combustion engine, with the housing member rotating together with one of the crankshaft and the camshaft. A rotor member is relatively rotatably assembled on a shoe portion provided on the housing member and forms an advanced angle chamber and a retarded angle chamber at a vane portion in the housing member, with the rotor member rotating together with the other of the camshaft or the crankshaft. A relative rotation controlling mechanism, upon unlock operation thereof established by being supplied with an operation fluid, allows relative rotation between the housing member and the rotor member. The relative rotation controlling mechanism, upon lock operation thereof established by a discharge of the operation fluid therefrom, restricts the relative rotation between the housing member and the rotor member at a lock phase position in an intermediate region located at a position other than the rotation limit ends corresponding to the advanced and retarded angle phase positions, respectively. A hydraulic pressure circuit controls an operation fluid supply/discharge of the relative rotation controlling mechanism and controls an operation fluid supply/discharge of each of the advanced angle chamber and the retarded angle chamber. The hydraulic pressure circuit, upon initiation of the internal combustion engine, discharges the operation fluid from the relative rotation controlling mechanism and the advanced and retarded angle chambers until a pressure of the operation fluid reaches a controllable pressure value. The hydraulic pressure circuit, after the pressure of the operation fluid reaches the controllable pressure value, is adapted to make one of the advanced and retarded angle chambers which is at a superior side of the in phase transfer response characteristic operation fluid filled, is adapted to subsequently make the other of the advanced and retarded angle chambers operation fluid filled, and is adapted to supply the operation fluid to the relative rotation controlling mechanism.

The hydraulic pressure circuit includes a hydraulic pressure control valve in which a control value of the hydraulic pressure control valve is updated, when making one of the advanced and retarded angle chambers which is at the superior side of the in phase transfer response characteristic operation fluid filled, on the basis of a control value for retaining a phase of the relative rotation controlling mechanism while the internal combustion engine is in a steady operation stage before operation of the internal combustion engine is terminated. The control value of the hydraulic pressure control valve can be amended or changed on the basis of the temperature of the operation fluid.

After a time duration has elapsed as measured from the initiation of the internal combustion engine, a decision is made whether or not the pressure of the operation fluid has reached the controllable pressure. The elapse of the time duration is amended depending on one of the temperature of the operation fluid and the revolution number of the internal combustion engine.

A sixth aspect of the present invention is to provide a variable valve timing system whose gist is to modify the structure of the first aspect, wherein switching the supply of the operation fluid from one of the advanced and retarded angle chambers which is at a superior side of in phase transfer response characteristic to the other is established on the basis of a detected value derived from phase detection means. The relative rotation controlling mechanism is made up of a first control mechanism and a second control mechanism, with the first control mechanism restricting the relative rotation in an advancing angle direction upon lock operation at the lock phase position, and the second control mechanism restricting the relative rotation in a retarding angle direction upon lock operation at the lock phase position. The operation fluid is allowed to flow between the hydraulic pressure circuit and the advanced angle chamber by way of the first control mechanism, and the operation fluid is allowed to flow between the hydraulic pressure circuit and the retarded angle chamber by way of the second control mechanism. The hydraulic pressure circuit is capable of being configured to establish that the operation fluid can be controlled by a sole hydraulic pressure control valve.

The hydraulic pressure control valve is adapted to: (1) discharge the operation fluid from the relative rotation controlling mechanism and the advanced and retarded angle chambers when a control current value is zero or minimized; (2) discharge the operation fluid from one of the advanced and retarded angle chambers which is at a superior side of in phase transfer response and supplying the operation fluid to the other when the control current value is at its low level; (3) interrupt the operation fluid supply to and the operation fluid discharge from each of the advanced angle chamber and the retarded angle chamber when the control current value is at its intermediate level; and (4) supply the operation fluid to one of the advanced and retarded angle chambers which is at a superior side of in phase transfer response and discharge the operation fluid from the other when the control current value is at its high level, with the control current value being made high from zero or the minimized level in a short time duration measured from a time when the pressure of the operation fluid becomes equal to or above the value of the controllable pressure.

The hydraulic pressure control valve is also adapted to: (1) discharge the operation fluid from the relative rotation controlling mechanism and the advanced and retarded angle chambers when a control current value is zero or minimized, (2) discharge the operation fluid from one of the advanced and retarded angle chambers and supply the operation fluid to the other when the control current value is at its low level; (3) interrupt the operation fluid supply to and the operation fluid discharge from each of the advanced angle chamber and the retarded angle chamber when the control current value is at its intermediate level; and (4) supply the operation fluid to one of the advanced and retarded angle chambers and discharge the operation fluid from the other when the control current value is at its high level, wherein the control current value is made high temporally such that thereafter the control current value is controlled to a predetermined control current value after the pressure of the operation fluid becomes equal to or above the value of the controllable pressure, when a transfer is made from a first condition to one of a second condition and a third condition, the first condition permitting the discharge of operation fluid from the relative rotation controlling mechanism and the advanced and retarded angle chambers, the second condition making it impossible to supply the operation fluid to and discharge the operation fluid from each of the advanced and retarded angle chambers, and the third condition permitting the discharge of the operation fluid from one of the advanced and retarded angle chambers and the supply of the operation fluid to the other of the advanced and retarded angle chambers.

Upon initiation of the internal combustion engine, in an initial stage of the initiation of the internal combustion, the hydraulic pressure circuit makes it possible to discharge the operation fluid from the advancing angle and retarded angle chambers and the relative rotation controlling mechanism. Thus, the operation fluid remaining in each of the advancing angle and retarded angle chambers can be discharged, resulting in that the remaining operation fluid fails to inhibit or disturb the relative rotation between the rotation member and the housing member, which causes the torque variation in the driving force transmitting system to make it possible to rotate the rotor member quickly relative to the housing member into the lock phase position between the advanced angle phase position and the retarded angle phase positions. In addition, at the initial stage of the internal engine initiation, the remaining operation fluid can be discharged from the relative rotation controlling mechanism, which results in that the lock operation performed therein can be made correct, thereby making it possible to regulate in a relatively precise or correct manner the relative rotation between the housing member and the rotor member at the lock phase position. Thus, the starting ability of the internal combustion engine can be improved.

Upon initiation of the internal combustion engine, in a later stage of the initiation of the internal combustion which comes after the pressure of the operation fluid becomes equal to or greater than the controllable pressure value, after the hydraulic pressure circuit makes one of the advanced and retarded angle chambers which is at the superior side of phase transfer response characteristic operation fluid filled, the other can be made operation fluid filled and the relative rotation controlling mechanism is capable of being supplied with the operation fluid. Thus, while the internal combustion engine transfers its later stage of the initiation operation to a steady operation stage, the relative rotation phase between the housing member and the rotor member can be made to substantially coincide with the lock phase position under the condition that the regulation of the relative rotation control mechanism is released (i.e., the locked state between the housing member and rotor member is released), the relative rotation phase between the housing member and the rotor member can be made stable in an intermediate phase or region.

The variable valve timing system is configured such that the hydraulic pressure circuit includes a hydraulic pressure control valve in which a control value of the hydraulic pressure control valve is updated, when making one of the advanced and retarded angle chambers which is at a superior side of in phase transfer response characteristic operation fluid filled, on the basis of a control value for retaining a phase of the relative rotation controlling mechanism while the internal combustion engine is in normal operation before the internal combustion engine is terminated. Thus, instrumental errors and deteriorations over time can be compensated, which makes it possible to provide constant operation fluid supply characteristics, thereby obtaining a specified operation response characteristic.

The control value of the hydraulic pressure control valve is amended on the basis of the temperature of the operation fluid. In more detail, the opening area of the hydraulic pressure control valve is made smaller (larger) due to lower (higher) viscosity of the operation fluid when the temperature of the operation fluid is high (low). This makes it possible to provide a constant operation fluid supply characteristic freely from the temperature of the operation fluid, thereby obtaining a specified operation response characteristic.

After the elapse of a time duration measured from the initiation of the internal combustion engine, a decision is made whether or not the pressure of the operation fluid reaches the controllable pressure. Thus, detecting whether or not the pressure of the operation fluid reaches the controllable pressure can be made without using a specially prepared hydraulic pressure detecting means.

The elapse of the time duration is amended or changed depending on one of the temperature of the operation fluid and the revolution number of the internal combustion engine. More specifically, making the time duration longer (shorter) when the temperature of the operation is low (high) or when the revolution number of the internal combustion engine is low (high) makes it possible to provide a constant operation fluid supply characteristic freely from the temperature of the operation fluid, thereby obtaining a specified operation response characteristic.

Switching the supply of the operation fluid from one of the advanced and retarded angle chambers which is at the superior side of the in phase transfer responsive to the other is established on the basis of a detected value derived from a phase detection mechanism such as a crank angle detector or cam angle sensors. This makes it possible to establish a switching of the operation fluid at a relative rotation phase in a precise or correct manner, thereby continually obtaining operation response characteristics.

The relative rotation controlling mechanism is made up of a first control mechanism and a second control mechanism, with the first control mechanism restricting the relative rotation in an advancing angle direction upon lock operation at the lock phase position, and the second control mechanism restricting the relative rotation in a retarding angle direction upon lock operation at the lock phase position. The operation fluid is allowed to flow between the hydraulic pressure circuit and the advanced angle chamber by way of the first control mechanism and is allowed to flow between the hydraulic pressure circuit and the retarded angle chamber by way of the second control mechanism so that the hydraulic pressure circuit is capable of being configured to establish control of the operation fluid by a sole hydraulic pressure control valve. Thus, a portion of a flow passage of the operation fluid which extends from the hydraulic pressure circuit to the advanced angle chamber can be used as a flow passage of the operation fluid which extends from the hydraulic pressure circuit to the first control mechanism, while a portion of a flow passage of the operation fluid which extends from the hydraulic pressure circuit to the retarded angle chamber can be used as a flow passage of the operation fluid which extends from the hydraulic pressure circuit to the second control mechanism. Accordingly, the hydraulic pressure circuit can be made much simpler, which results in the hydraulic pressure circuit being capable of being produced in a much smaller size and at a lower cost.

The hydraulic pressure control valve is adapted to: (1) discharge the operation fluid from the relative rotation controlling mechanism and the advanced and retarded angle chambers when a control current value is zero or minimized; (2) discharge the operation fluid from one of the advanced and retarded angle chambers which is at a superior side of in phase transfer response and supply the operation fluid to the other when the control current value is at its low level; (3) interrupt the operation fluid supply to and the operation fluid discharge from each of the advanced angle chamber and the retarded angle chamber when the control current value is at its intermediate level; and (4) supply the operation fluid to one of the advanced and retarded angle chambers which is at a superior side of in phase transfer response and discharge the operation fluid from the other when the control current value is at its high level. The control current value is made high from zero or the minimized level in a relatively short time duration measured from when the pressure of the operation fluid becomes equal or above the value of the controllable pressure. Thus, when the control current shifts from zero or the minimized level (under which the operation fluid can be discharged from the advancing and retarded angle chambers) to the high level (under which the operation fluid can be supplied to one of the advanced and retarded angle chambers which is at the superior side of phase transfer response characteristic, while the operation fluid can be discharged from the other), the time required for such a shift can be minimized.

As a result, even though at the time when the pressure of the operation fluid becomes equal or above the controllable pressure value the operation fluid remains in the advancing and retarded angle chambers and for example the retarded angle chamber is supplied with the operation fluid under the condition that the control current value is at a low level temporally while the control current value shifts from zero or the minimized level to a high level, due to the fact that the condition that the control current value is at a low level temporally lasts for a very small time duration and the amount of operation fluid supplied to the retarded angle chamber is very small, the second control mechanism fails to perform the unlock operation. In the aforementioned temporal period, for example, if the amount of the operation fluid supplied to the retarded angle chamber is large (i.e., the time duration is long during which the control current value takes low level), the supplied operation fluid is added to the remaining operation fluid in the retarded angle chamber, which may make the relative rotation phase between the housing member and the rotor member unstable temporally due to unlock operation of the second control mechanism.

The hydraulic pressure control valve is also adapted to: (1) discharge the operation fluid from the relative rotation controlling mechanism and the advanced and retarded angle chambers when a control current value is zero or minimized; (2) discharge the operation fluid from one of the advanced and retarded angle chambers and supply the operation fluid to the other when the control current value is at its low level; (3) interrupt the operation fluid supply to and the operation fluid discharge from each of the advanced angle chamber and the retarded angle chamber when the control current value is at its intermediate level; and (4) supply the operation fluid to one of the advanced and retarded angle chambers and discharge the operation fluid from the other when the control current value is at its high level. The control current value is made high temporally such that thereafter the control current value is controlled to a predetermined control current value after the pressure of the operation fluid becomes equal to or above the value of the controllable pressure, when a transfer is made from a first condition to one of a second condition and a third condition, with the first condition being made possible to discharge the operation fluid from the relative rotation controlling mechanism and the advanced and retarded angle chambers, the second condition being made impossible to supply the operation fluid to and discharge the operation fluid from each of the advanced and retarded angle chambers, and the third condition being made possible to discharge the operation fluid from one of the advanced and retarded angle chambers and supply the operation fluid to the other of the advanced and retarded angle chambers. Thus, temporally changing the control current value from zero or the minimized level to a high level makes it possible to minimize correctly the time duration during which the control current takes a low level (which shows that the operation fluid can be supplied to and discharged from the retarded angle chamber and the advanced angle chamber, respectively). This results in correct or precise supply/discharge of the operation fluid (e.g., supplying the operation fluid to the advanced angle chamber is made possible, while discharging the operation fluid from the retarded angle chamber is made possible.) and subsequent control of the control current value (e.g., supplying the operation fluid to and discharging the operation fluid from each of supplying the advancing and retarded angle chambers are impossible).

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
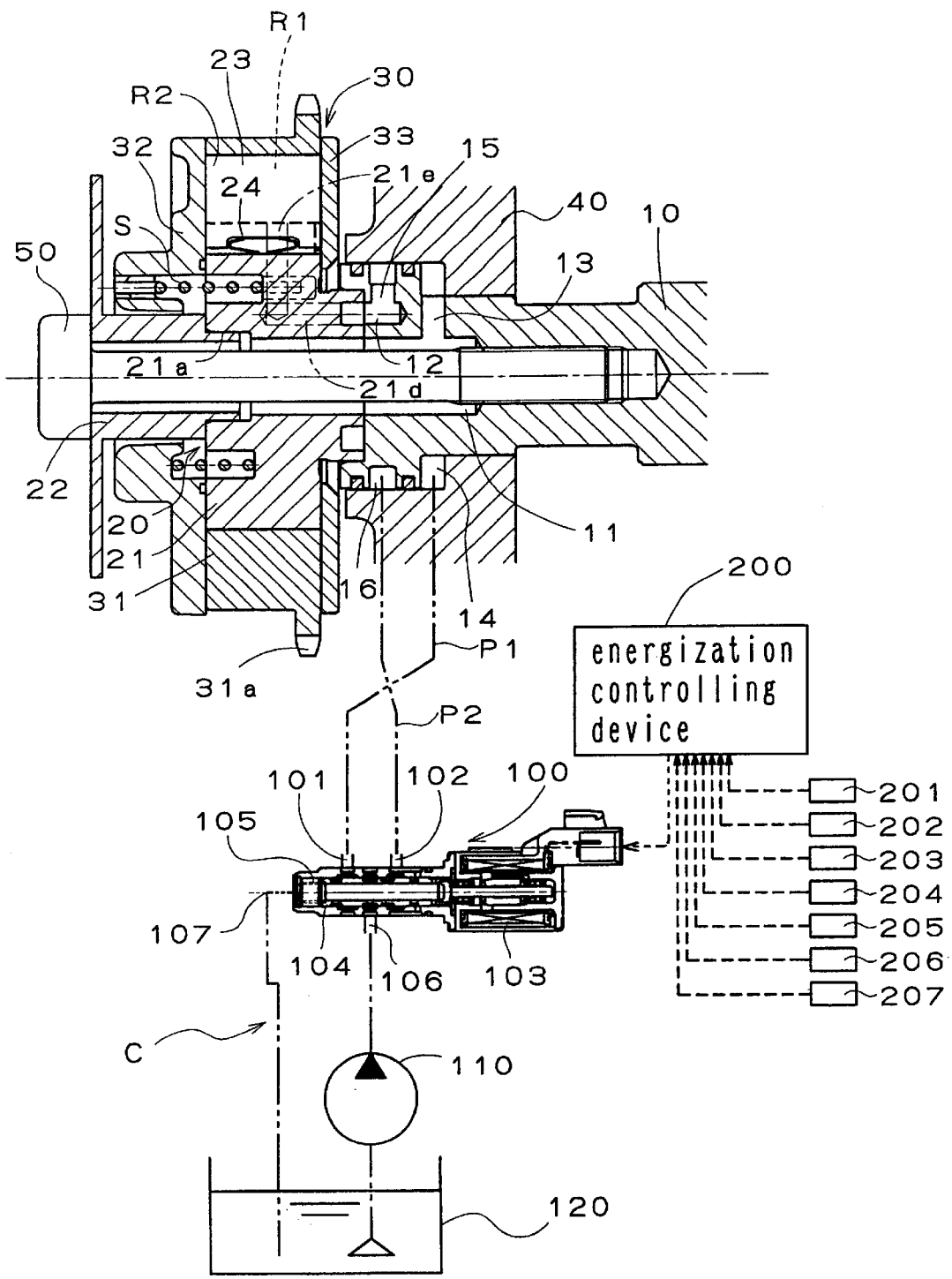
FIG. 1 is a schematic view of a variable valve timing system according to an embodiment of the present invention.

Referring to FIGS. 1–12, the variable valve timing system includes a rotor member 20 assembled as one unit with the tip portion of a camshaft 10 and a housing member 30 supported by the rotor member 20 and rotatable within a predetermined range. The variable valve timing system also includes a torsion spring S disposed between the housing member 30 and the rotor member 20, and a relative rotation controlling mechanism B (shown in FIG. 2) for restricting relative rotation of the housing member 30 and the rotor member 20. The variable valve timing system further includes a hydraulic pressure circuit C for controlling the supply and discharge of operation fluid to the relative rotation controlling mechanism B as well as for controlling the supply and discharge of the operation fluid to an advanced angle chamber R1 and a retarded angle chamber R2.

The camshaft 10 has a known cam profile for controlling the opening and closing of an intake valve and is rotatably supported by a cylinder head 40 of the combustion engine. The camshaft 10 includes an advanced angle passage 11 and a retarded angle passage 12 extending in the axial direction of the camshaft 10. The advanced angle passage 11 is connected to a first connecting port 101 of a hydraulic pressure controlling valve 100 via a first passage 13 formed in the radial direction, a first annular passage 14, and a first connecting passage P1. The retarded angle passage 12 is connected to a second connecting port 102 of the hydraulic pressure controlling valve 100 via a second passage 15 formed in the radial direction, a second annular passage 16, and a second connecting passage P2. The first and second passages 13, 15 formed in the radial direction and the second annular passage 16 are formed in the cam shaft 10. The first annular passage 14 is formed in a stepped portion between the camshaft 10 and the cylinder head 40.

The rotor member 20 includes a main rotor 21 and a front rotor 22 having a cylindrical shape with stepped portion assembled as one unit on the front (i.e., left side of FIG. 1) of the main rotor 21. The rotor member 20 is engaged with the front end of the camshaft 10 as one unit by a bolt 50. The central inner bores of the main rotor 21 and the front rotor 22 whose front end are closed by a head portion of the bolt 50 communicate with the advanced angle passage 11 provided on the camshaft 10.

The main rotor 21 includes an inner bore 21a coaxially assembled with the front rotor 22 and four vane grooves 21b for receiving four vanes 23 respectively and four springs 24 biasing the vanes 23 in the radially outward direction. Respective vanes 23 assembled in the vane grooves 21b extend in the radially outward direction and thus form the advanced angle chambers R1 and the retarded angle chambers R2 respectively in the housing member 30.

The main rotor 21 includes four third passages 21c extending in the radial direction in fluid communication with the advanced angle passage 11 at the radial inner end via the central inner bores and in fluid communication with the advanced angle chambers R1 at the radial outer end. The main rotor 21 also includes four passages 21d extending in the axial direction in fluid communication with the retarded angle passage 12 and four fourth passages 21e extending in the radial direction in fluid communication with the respective passages 21d at the radially inner end and in fluid communication with the retarded angle chamber R2 at the radially outer end.

The housing member 30 includes a housing body 31, a front plate 32, a rear thin plate 33, and five bolts 34 (shown in FIG. 2) connecting the parts of the housing member as one unit. The housing body 31 integrally includes a sprocket 31*a* on the outer rear periphery so that the sprocket 31*a* is formed as one unit with the housing body 31. The sprocket 3*a* is connected to the crankshaft of the combustion engine via a timing chain and is rotated in the clockwise direction of FIG. 2 by the driving force transmitted from the crankshaft.

The housing body 31 has four shoe portions 31*b* projecting in the radially inward direction and rotatably supports the main rotor 21 by the radial inner ends of respective shoe portions 31*b*. The opposing end face of the front plate 32 and the rear thin plate 33 slidably contact the outer peripheral end face of the main rotor 21 and the end face of the respective vanes 23. The housing body 31 is also formed with a lug 31*c* restricting the retarded angle phase with the vanes 23 and a lug 31*d* restricting the advanced angle phase with the vanes 23.

Figure 2:
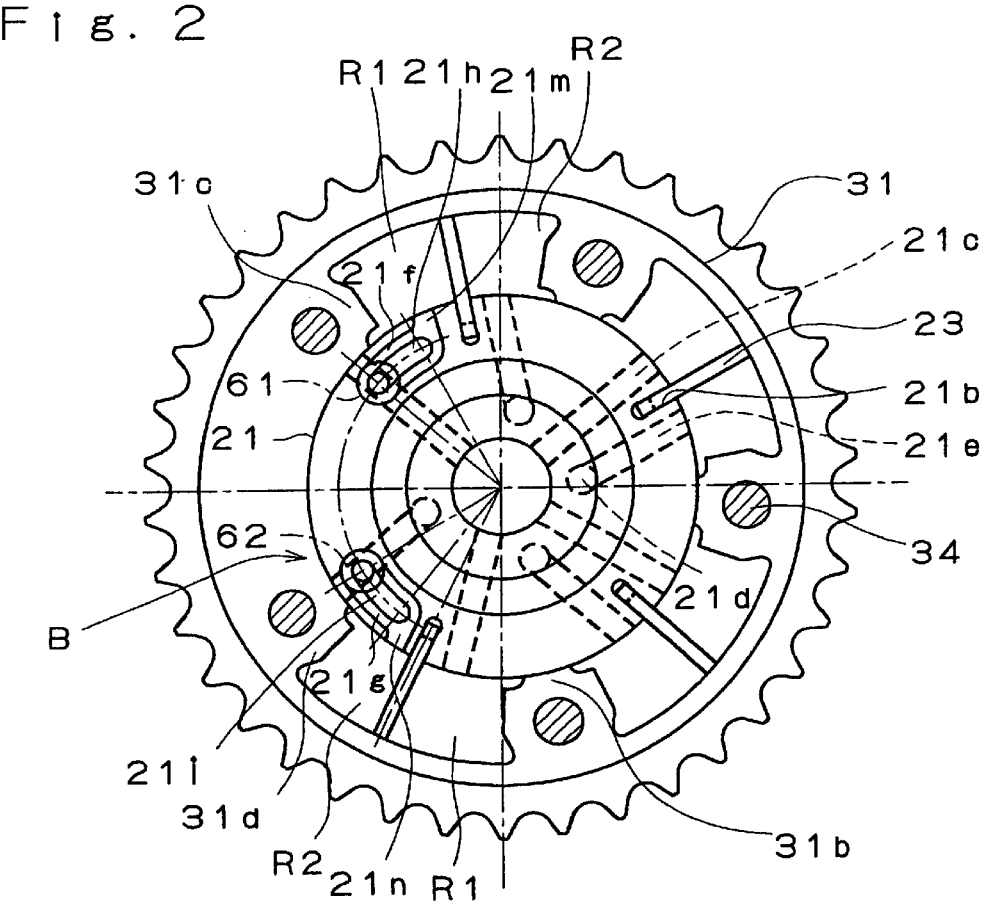
FIG. 2 is a cross sectional view of a portion of the variable valve timing system in FIG. 1 viewed from the front.
Figure 3:
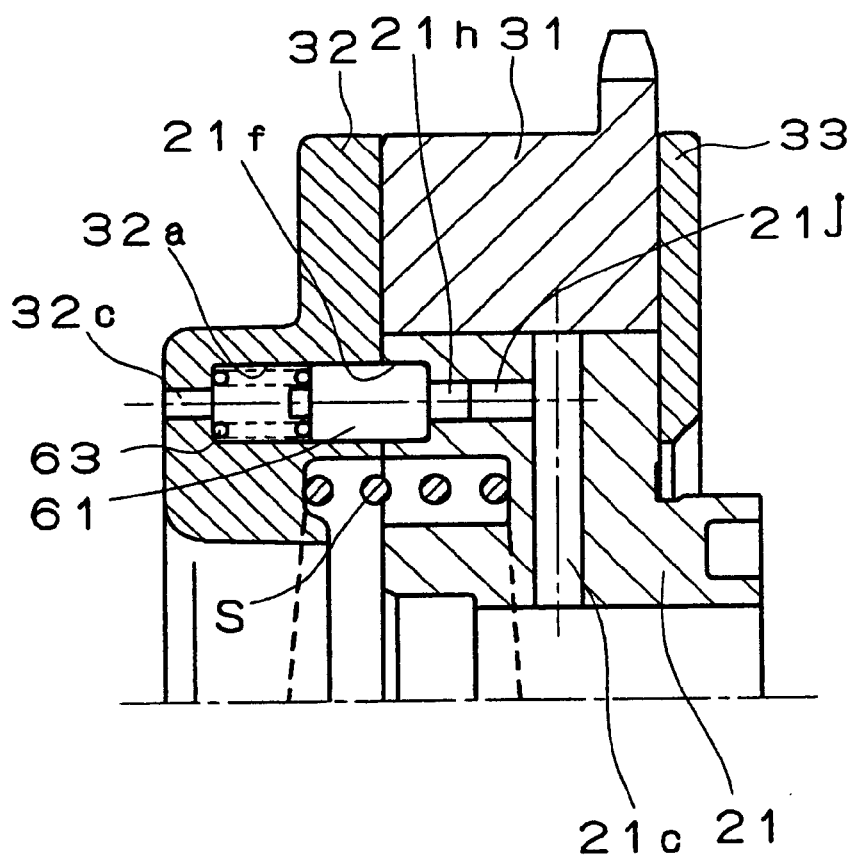
FIG. 3 is a cross sectional view of the upper lock pin portion shown in FIG. 2.
Figure 4:
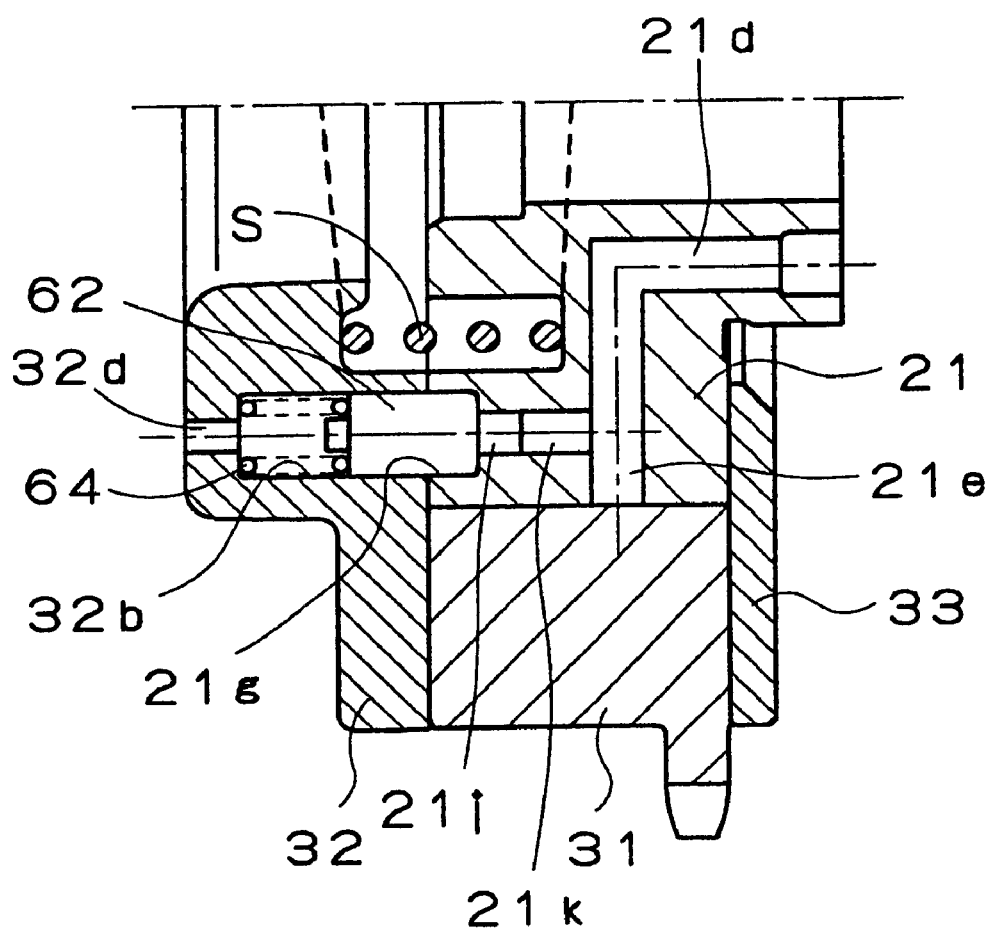
FIG. 4 is a cross-sectional view of the lower lock pin portion shown in FIG. 2.

Upon unlocking operation of the relative rotation controlling mechanism B through the supply of the operation fluid, the relative rotation of the housing member 30 and the rotor member 20 is allowed. Upon locking operation of the relative rotation controlling mechanism B through the discharge of the operation fluid, the relative rotation of the housing member 30 and the rotor member 20 is restricted at the intermediate angle phase or the lock phase angle (the condition shown in FIG. 2) between the retarded angle phase position and the advanced angle phase position. As shown in FIGS. 2–4, the relative rotation controlling mechanism B is provided with a pair of lock pins 61, 62 and a pair of lock springs 63, 64. The relative rotation controlling mechanism B is made up of a first control mechanism which includes the lock pin 61 and the lock spring 63, and a second control mechanism which includes the look pin 62 and the lock spring 64.

The first control mechanism performs an unlock operation when the operation fluid is supplied thereto from the advanced angle passage 11, to allow relative rotation between the housing member 30 and the rotor member 20, while the first control mechanism performs a lock operation when the operation fluid is discharged therefrom into the advanced angle passage 11 to restricts at the lock phase position (the condition shown in FIG. 2) relative rotation between the housing member 30 and the rotor member 20 in the advanced angle direction.

The second control mechanism performs an unlock operation when the operation fluid is supplied thereto from the retarded angle passage 12 to allows relative rotation between the housing member 30 and the rotor member 20, while the second control mechanism performs a lock operation when the operation fluid is discharged therefrom into the retarded angle passage 12 to restrict at the lock phase position (the condition shown in FIG. 2) the relative rotation between the housing member 30 and the rotor member 20 in the retarded angle direction.

Each of the look pin 61, 62 is slidable in the axially outward direction within the axially extending retracting bores 32*a*, 32*b* provided in the front plate 32. Each lock pin 61, 62 is biased in the outward direction of the retracting bores 32*a*, 32*b* by the lock springs 63, 64. The lock springs 63, 64 are accommodated in the retracting bores 32*a*, 32*b*. Each retracting bore 32*a*, 32*b* is provided with open bores 32*c*, 32*d* for smoothly moving the lock pins 61, 62 in the axial direction.

The tip portion of each lock pin 61, 62 can be detachably supported by an arc-shaped lock grooves 21*f*, 21*g* formed in the main rotor 21. By supplying the operation fluid to the arc-shaped lock grooves 21*f*, 21*g*, the lock pins 61, 62 move in the axially outward direction by overcoming the biasing force (predetermined as a small value) of the lock springs 63, 64 thus being retracted to be accommodated in the retracting bores 32*a*, 32*b*. The tip portion of each lock pin 61, 62 is in contact with the end face of the main rotor 21, and is slidably movable under the contact condition.

When the rotor member 20 is positioned at the lock phase position relative to the housing member 30 as shown in FIG. 2, each end portion of the arc-shaped lock grooves 21*f*, 21*g* is positioned to oppose the corresponding retracting bore 32*a*, 32*b*. Each bottom portion of the arc-shaped lock grooves 21*f*, 21*g* is provided with circular connecting grooves 21*h*, 21*i* and bores 21*j*, 21*k* in the axial direction. As shown in FIGS. 2 and 3, the arc-shaped lock groove 21*f* is connected with the advanced angle passage 11 through the circular connecting groove 21*h*, the axially extending bore 21*j*, and the radially extending bore 21*c*. The arc-shaped lock groove 21*f* is also connected with the advanced angle chamber R1 through a connecting groove 21*m* extending in the radially outward direction.

As shown in FIGS. 2 and 4, the arc-shaped lock groove 21*g* is connected with the retarded angle passage 12 through the circular connecting groove 21*i*, the axially extending bore 21*k*, the radially extending bore 21*e*, and the axially extending bore 21*d*. The arc-shaped look groove 21*g* is also connected with the retarded angle chamber R2 through a connecting groove 21*n* extending in the radially outward direction.

The torsion spring S disposed between the housing member 30 and the rotor member 20 rotates the rotor member 20 toward the advanced angle side relative to the housing member 30. The biasing force of the torsion spring S is predetermined to be of a value for canceling the biasing force (i.e., derived from the spring biasing the intake valve in the closing direction) for the camshaft 10 and the rotor member 20 rotating towards the retarded angle side. Thus, good response can be obtained when the relative rotation phase of the rotor member 20 relative to the housing member 30 is varied to the advanced angle side.

The hydraulic pressure controlling valve 100 which is shown in FIG. 1 constitutes the hydraulic pressure circuit C, with an oil pump 110 actuated by the internal combustion engine and an oil reservoir 120 of the combustion engine. A spool 104 of the hydraulic pressure controlling valve 100 is moved in the left direction as viewed in FIG. 1 against the urging force of a spring 105 by the energization of a solenoid 103 in response to an output signal from an energization controlling device 200. By varying duty value, the spool 104 is operated in the manner shown in FIGS. 5–11. The energization controlling device 200 controls the output (i.e., duty value) in accordance with the operational condition of the internal combustion by following a predetermined controlling routine and by being based on the detected signal from sensors (i.e., sensors 201, 202, 203, 204, 205, 206, and 207 for detecting the crank angle, cam angle, throttle opening degree, engine rpm, temperature of the engine cooling water, vehicle speed, and oil pump discharge pressure, respectively).

Figure 5:
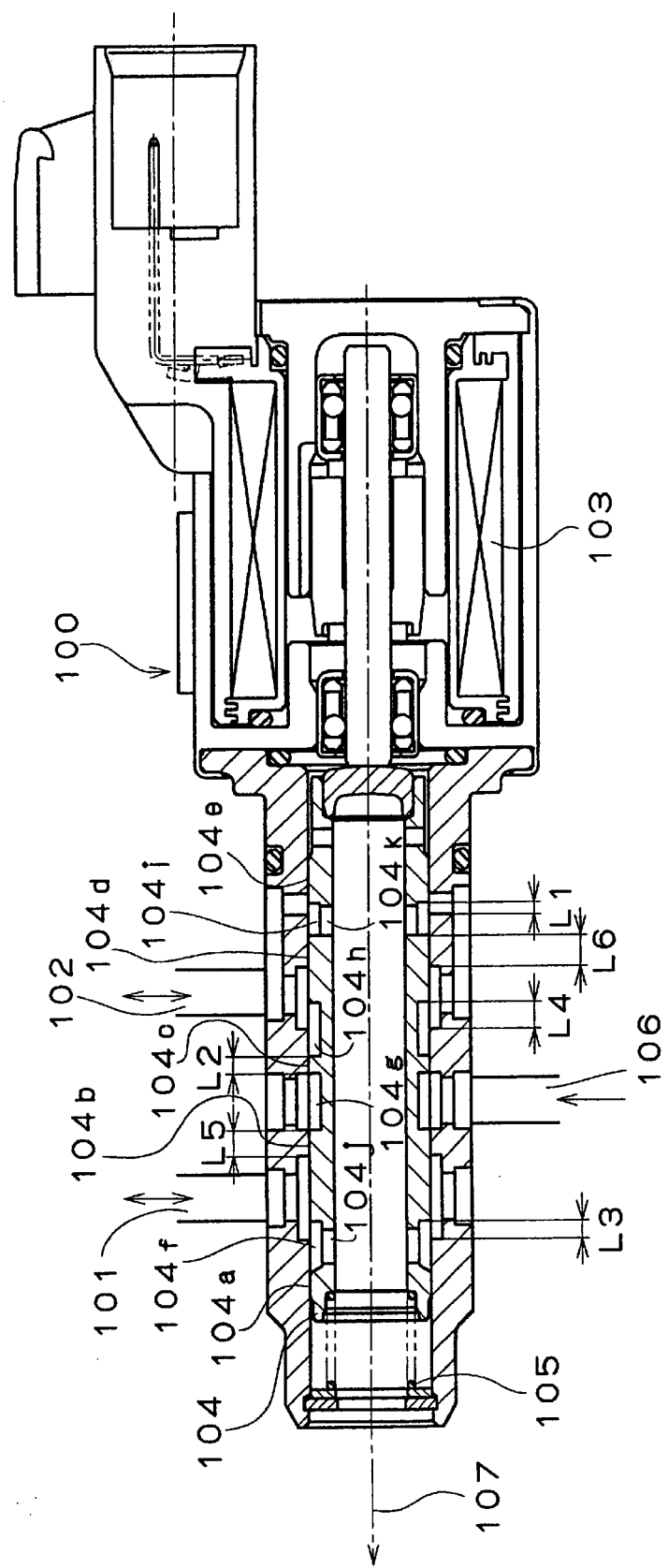
FIG. 5 is an enlarged cross-sectional view of the hydraulic pressure controlling valve shown in FIG. 1.

As shown in FIG. 5 in more detail, the spool 104 is provided with five land portions 104*a*, 104*b*, 104*c*, 104*d*, 104*e*, four annular grooves 104*f*, 104*g*, 104*h*, 104*i* each formed between adjacent pairs of land portions, and a pair of connecting bores 104*j*, 104*k* connecting the annular grooves 104*f*, 104*i* to a discharge port 107. The overlapping amount of each portion as shown in FIG. 5 is set to be L1<L2<L3<L4<L5<L6.

When the spool 104 is under the condition shown in FIG. 5 (duty value=0%: de-energized condition due to the control current value=0), the fluid communication between the supply port 106 connected to an outlet opening of the oil pump 110 and both connecting ports 101, 102 is blocked by the land portions 104b, 104c. Both connecting ports 101, 102 are connected with the discharge port 107 connected to the oil reservoir 120 through the annular grooves 104f, 104i and the connecting bores 104j, 104k. The operation fluid can be discharged from both connecting ports 101, 102 to the discharge port 107. Accordingly, the operation fluid can be discharged from each advanced angle chamber R1, retarded angle chamber R2, and both arc-shaped lock grooves 21f, 21g of the relative rotation controlling mechanism B to the oil reservoir 120.

Figure 6:
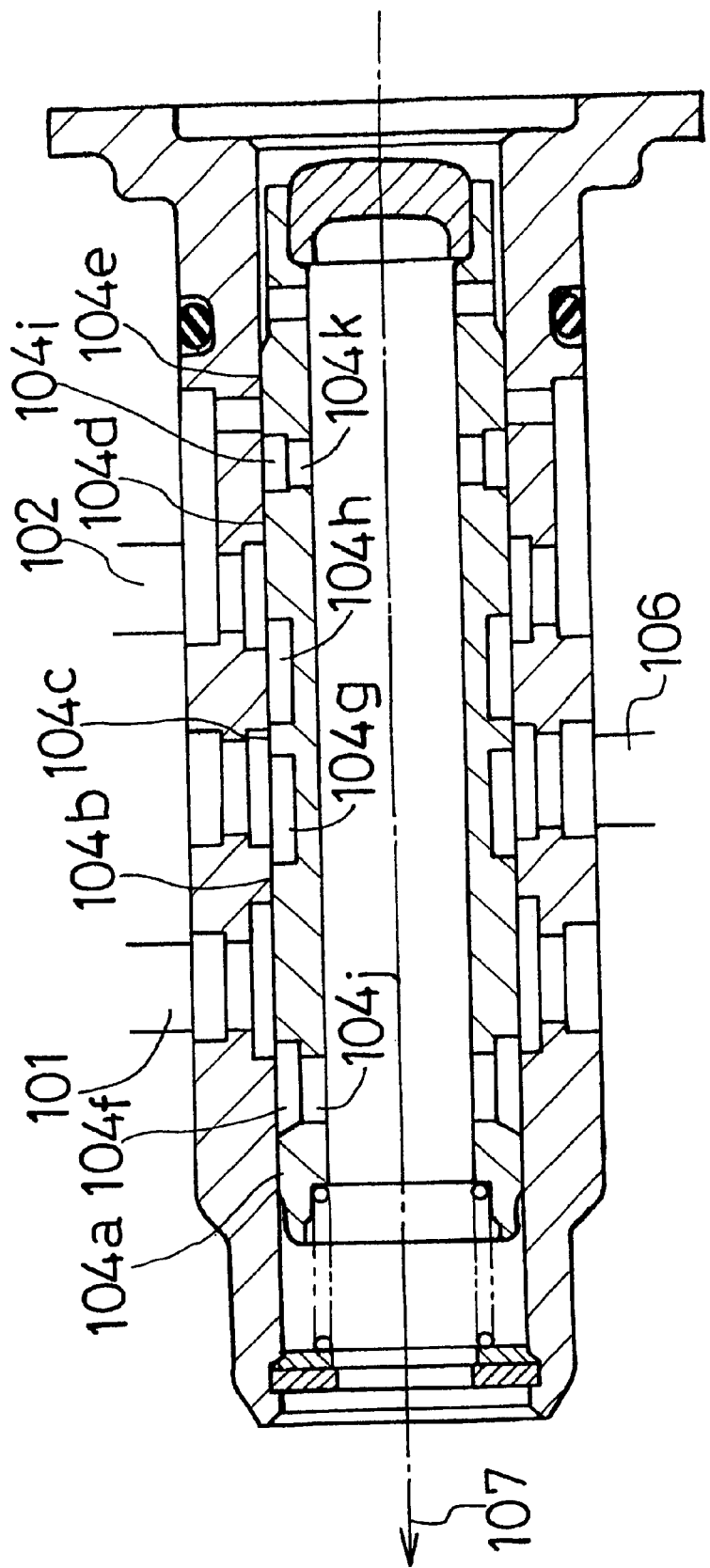
FIG. 6 is a cross-sectional view of the hydraulic pressure controlling valve shown in FIG. 5 under a first energization condition.

When the spool 104 is under the condition shown in FIG. 6, the fluid communication between the supply port 106 and both connecting ports 101, 102 is blocked by the land portions 104b, 104c. The fluid communication between the first connecting port 101 and the discharge port 107 is established by way of the annular groove 104f and the connecting bore 104j and the operation fluid can be discharged from the connecting port 101 to the discharge port 107. The fluid communication between the second connecting port 102 and the discharge port 107 is blocked by the land portions 104d, 104e. Accordingly, the operation fluid can be discharged from each advanced angle chamber R1 and the arc-shaped lock groove 21f of the relative rotation controlling mechanism B through the hydraulic pressure controlling valve 100 to the oil reservoir 120. The operation fluid can be blocked in each retarded angle chamber R2 and the arc-shaped lock groove 21g of the relative rotation controlling mechanism B.

Figure 7:
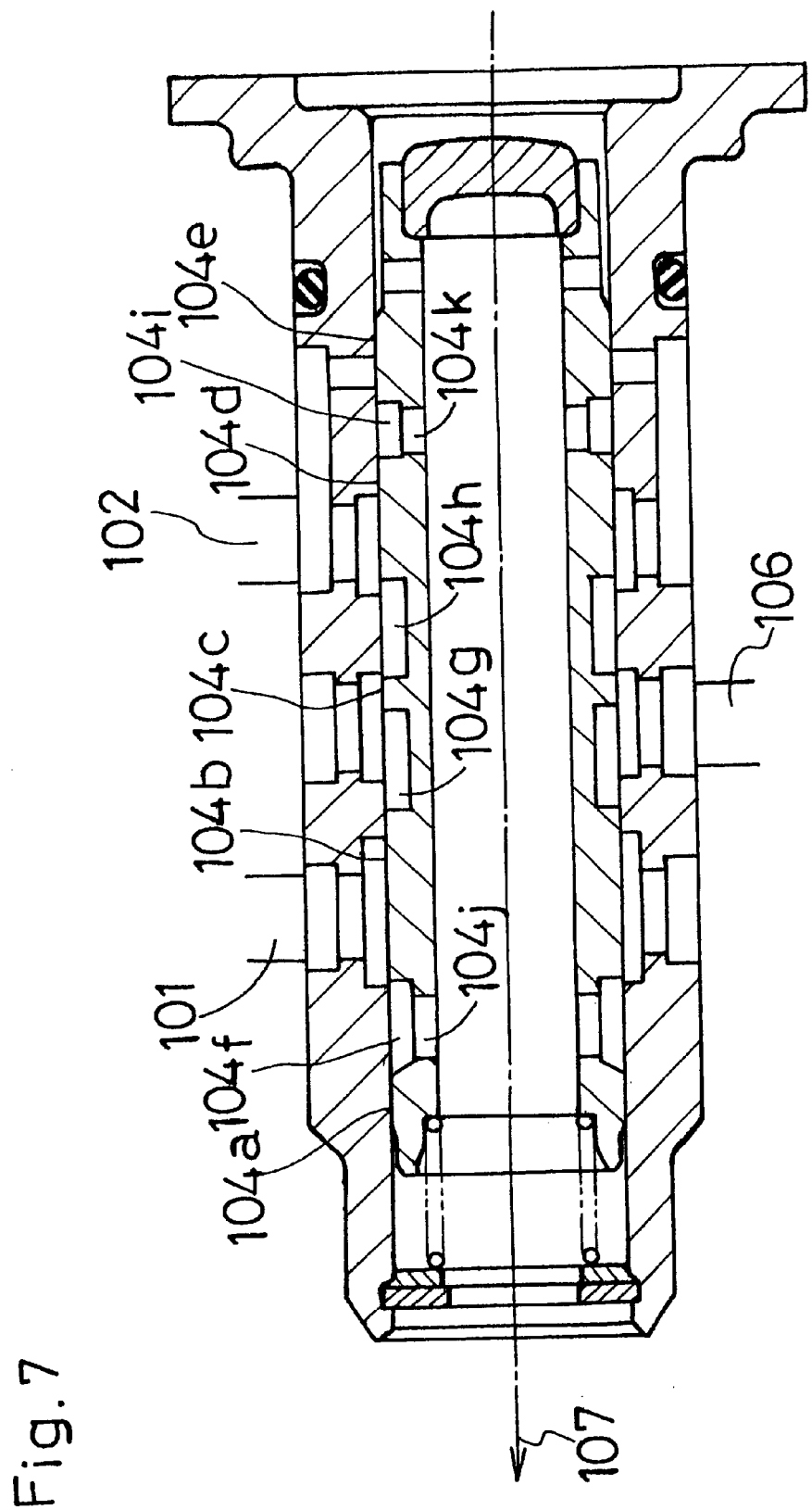
FIG. 7 is a cross-sectional view of the hydraulic pressure controlling valve shown in FIG. 5 under a second energization condition.

When the spool 104 is under the condition shown in FIG. 7 (under which the control current value is at a low level), the fluid communication between the supply port 106 and the first connecting port 101 is blocked by the land portion 104b. The fluid communication between the supply port 106 and the second connecting port 102 is established through the annular groove 104h. The fluid communication between the connecting port 101 and the discharge port 107 is established through the annular groove 104f, and the connecting bore 104j. Thus, the operation fluid can be supplied from the supply port 106 to the second connecting port 102. Then the operation fluid can be discharged from the connecting port 101 to the discharge port 107. Accordingly, the operation fluid can be supplied to the retarded angle chamber R2, and the arc-shaped lock grooves 21g of the relative rotation controlling mechanism B through the hydraulic pressure controlling valve 100. Further, the operation fluid can be discharged from each advanced angle chamber R1 and the arc-shaped lock groove 21f of the relative rotation controlling mechanism B to the oil reservoir 120 by way of the hydraulic pressure controlling valve 100.

Figure 8:
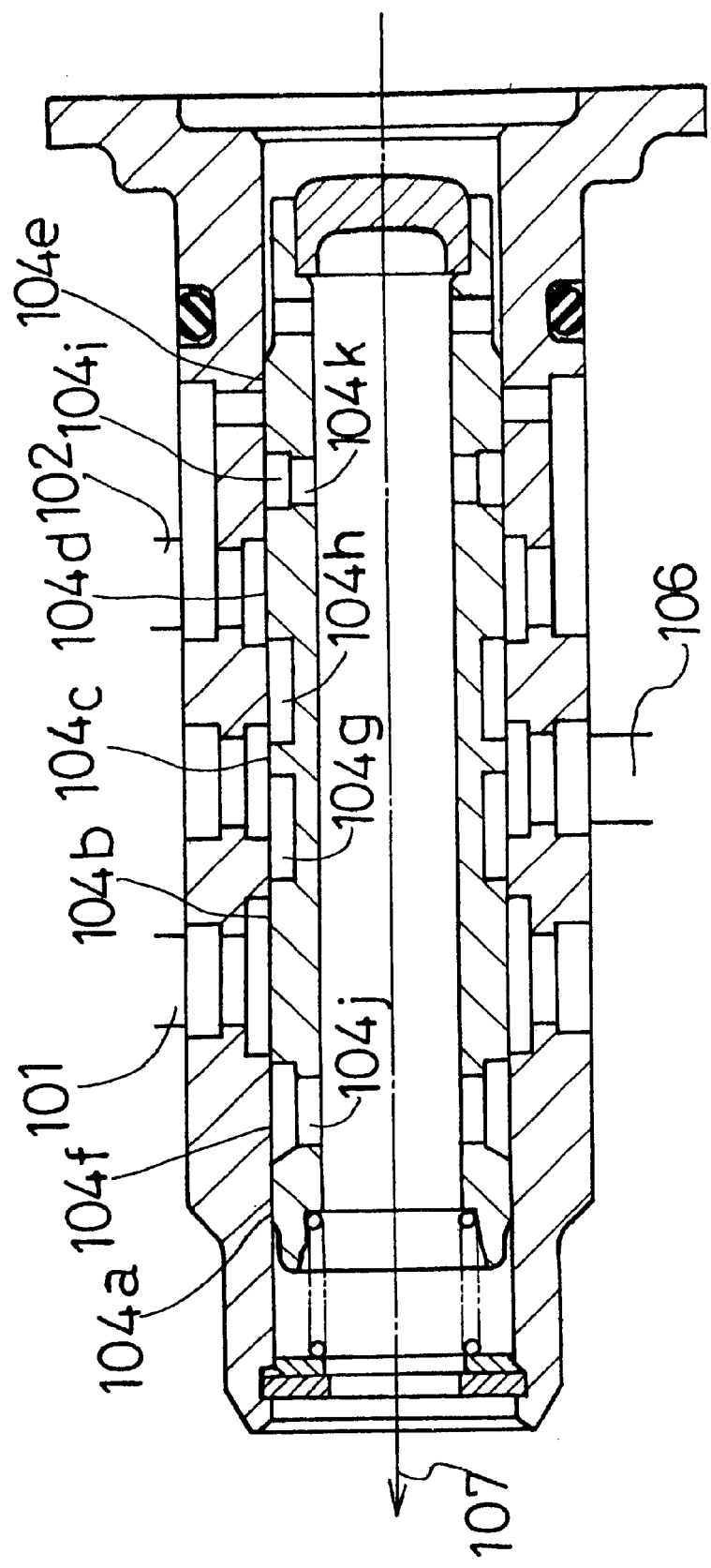
FIG. 8 is a cross-sectional view of the hydraulic pressure controlling valve shown in FIG. 5 under a third energization condition.

When the spool 104 is under the condition shown in FIG. 8, the fluid communication between the supply port 106 and the first connecting port 101 is blocked by the land portion 104b. The fluid communication between the supply port 106 and the second connecting port 102 is established through the annular groove 104h. The fluid communication between the connecting port 101 and the discharge port 107 is blocked by the land portion 104b. Thus, the operation fluid can be supplied from the supply port 106 to the second connecting port 102. Accordingly, the operation fluid can be supplied to the retarded angle chamber R2 and the arc-shaped look groove 21g of the relative rotation controlling mechanism B through the hydraulic pressure controlling valve 100. The operation fluid can be blocked in each the advanced angle chamber R1 and the arc-shaped lock groove 21f of the relative rotation controlling mechanism B.

Figure 9:
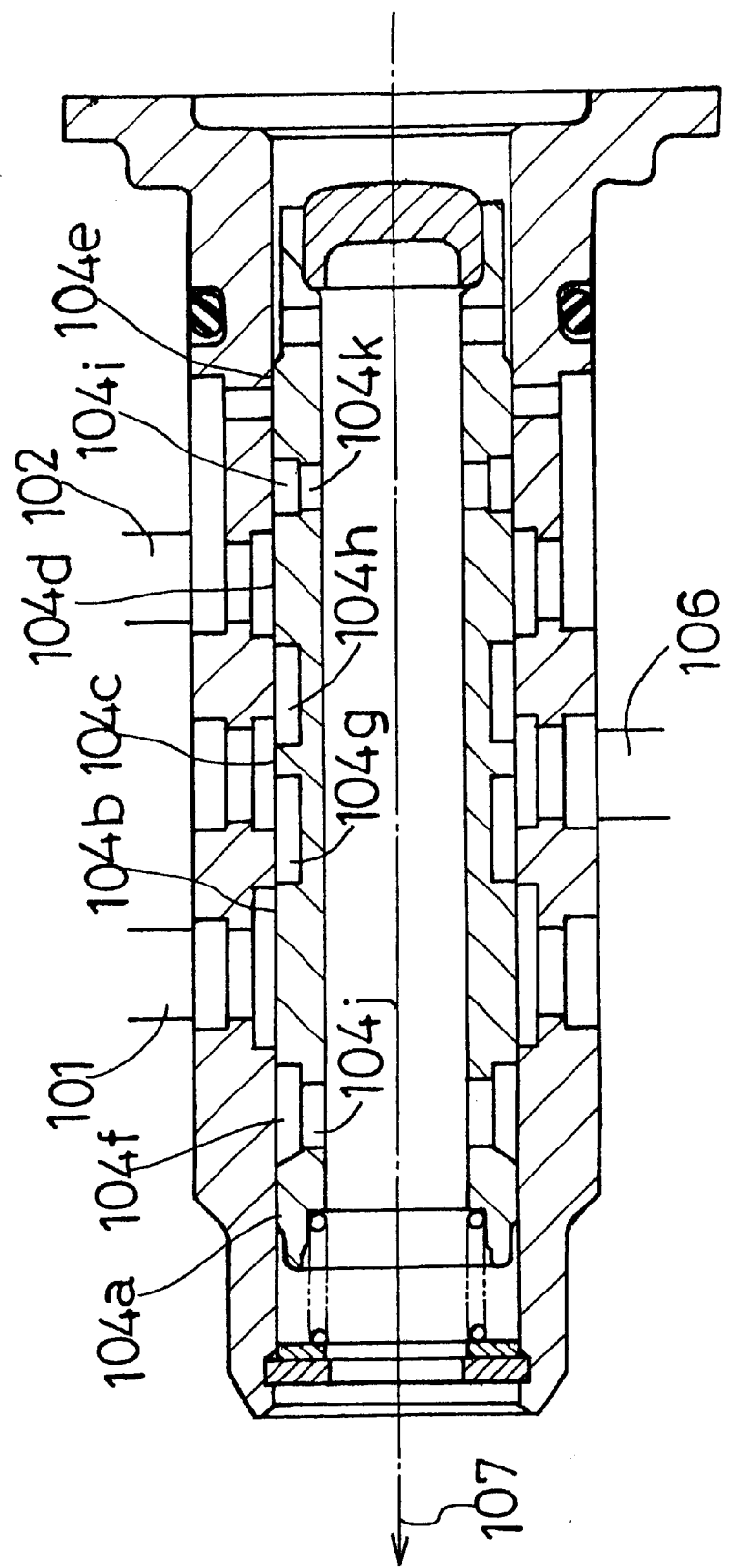
FIG. 9 is a cross-sectional view of the hydraulic pressure controlling valve shown in FIG. 5 under a fourth energization condition.

When the spool 104 is under the condition shown in FIG. 9 (under which the control current value is at its intermediate level), the fluid communication between the supply port 106 and both connecting ports 101, 102 is blocked by the land portions 104b, 104d respectively. The fluid communication between the discharge port 107 and the connecting port 101 is blocked by the land portion 104b while the fluid communication between the discharge port 107 and the connecting port 102 is blocked by the land portions 104d, 104e. Accordingly, the operation fluid can be blocked in each advanced angle chamber R3, retarded angle chamber R2, and both arc-shaped lock grooves 21f, 21g of the relative rotation controlling mechanism B.

Figure 10:
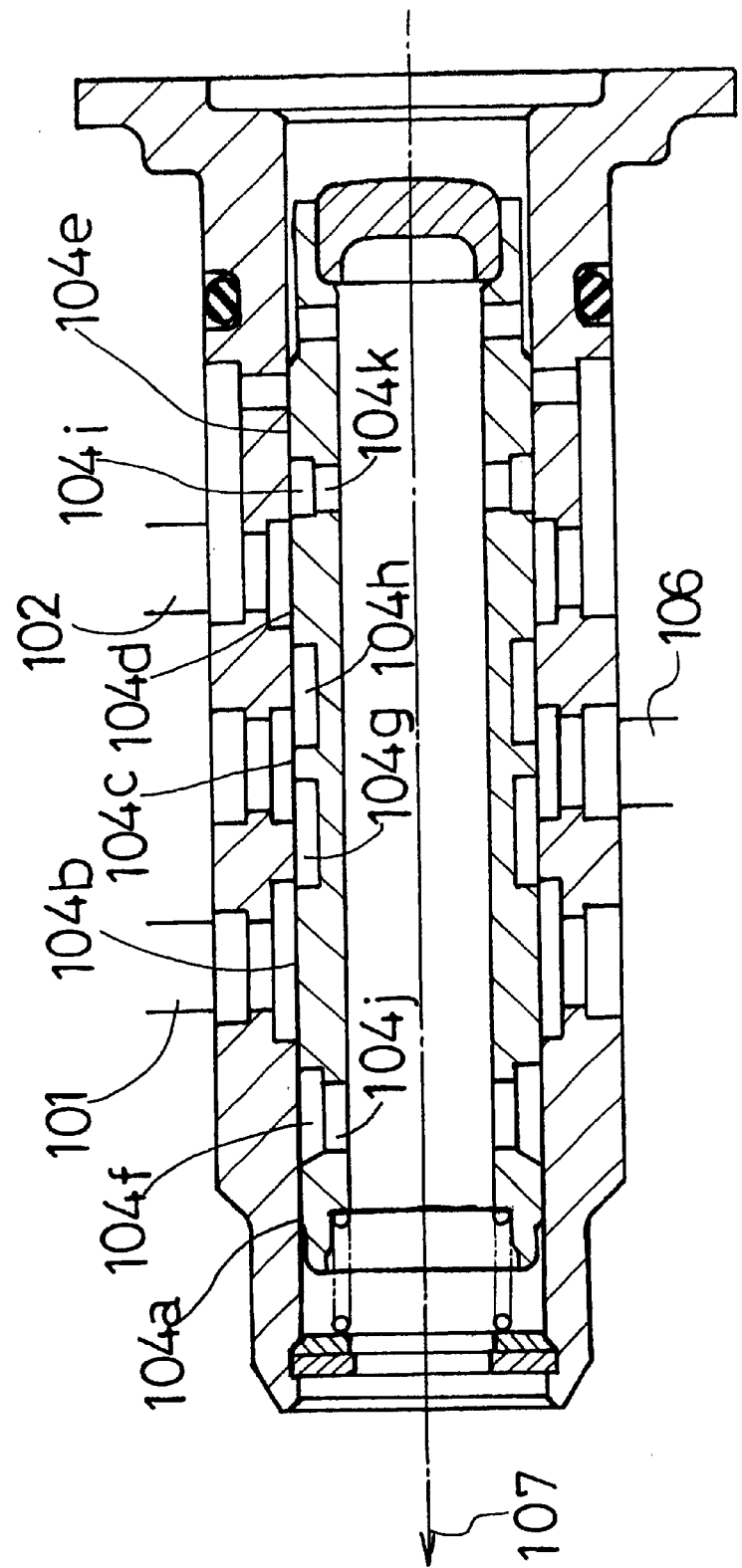
FIG. 10 is a cross-sectional view of the hydraulic pressure controlling valve shown in FIG. 5 under fifth energization condition.

When the spool 104 is under the condition shown in FIG. 10, the fluid communication between the supply port 106 and the land portion 102 is blocked by the land portion 104d. The fluid communication between the supply port 106 and the connecting port 101 is established by way of the annular groove 104g. The fluid communication between the connecting port 102 and the discharge port 107 is blocked by both land portions 104d, 104e. The operation fluid can thus be supplied from the supply port 106 to the connecting port 101. Accordingly, the operation fluid can be supplied to each advanced angle chamber R1, and the arc-shaped lock groove 21f of the relative rotation controlling mechanism B through the hydraulic pressure controlling valve 100. The operation fluid can be blocked in each retarded angle chamber R2, and the arc-shaped lock groove 21g of the relative rotation controlling mechanism B.

Figure 11:
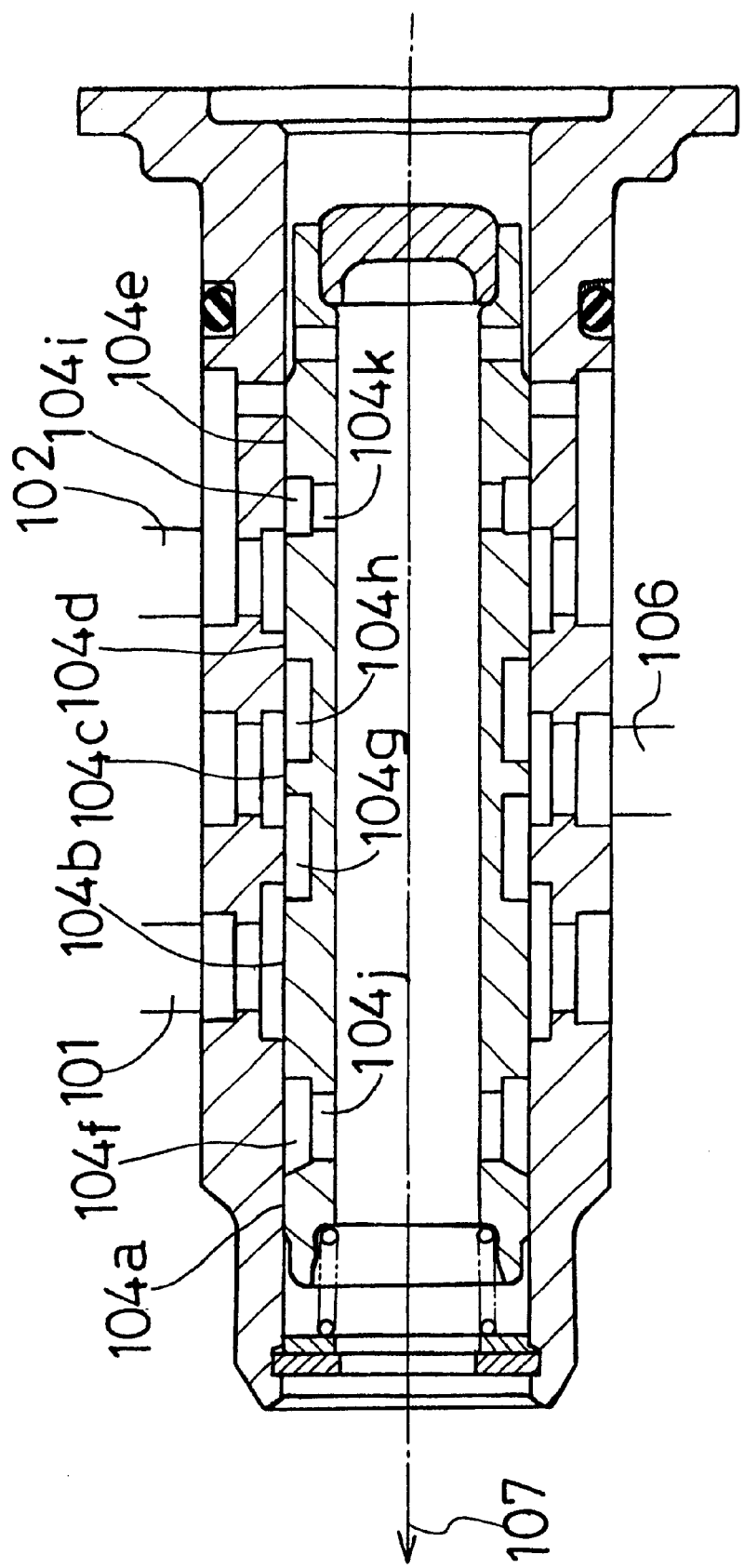
FIG. 11 is a cross-sectional view of the hydraulic pressure controlling valve shown in FIG. 5 under a sixth energization condition.

When the spool 104 is under the condition shown in FIG. 11 (under which the duty value is 100%, i.e. the control current value is at a high level), the fluid communication between the supply port 106 and the connecting port 102 is blocked by the land portion 104d. The fluid communication between the supply port 106 and the connecting port 101 is established through the annular groove 104g. The connecting port 102 is connected with the discharge port 107 through the annular groove 104l and the connecting bore 104k. The operation fluid can thus be supplied from the supply port 106 to the connecting port 101. The operation fluid can be discharged from the connecting port 102 to the discharge port 107. Accordingly, the operation fluid can be supplied to each advanced angle chamber R1 and the arc-shaped lock groove 21f of the relative rotation controlling mechanism B by way of the hydraulic pressure controlling valve 100. The operation fluid can be discharged from each retarded angle chamber R2, and the arc-shaped lock groove 21g of the relative rotation controlling mechanism B through the hydraulic pressure controlling valve 100.

Figure 12:
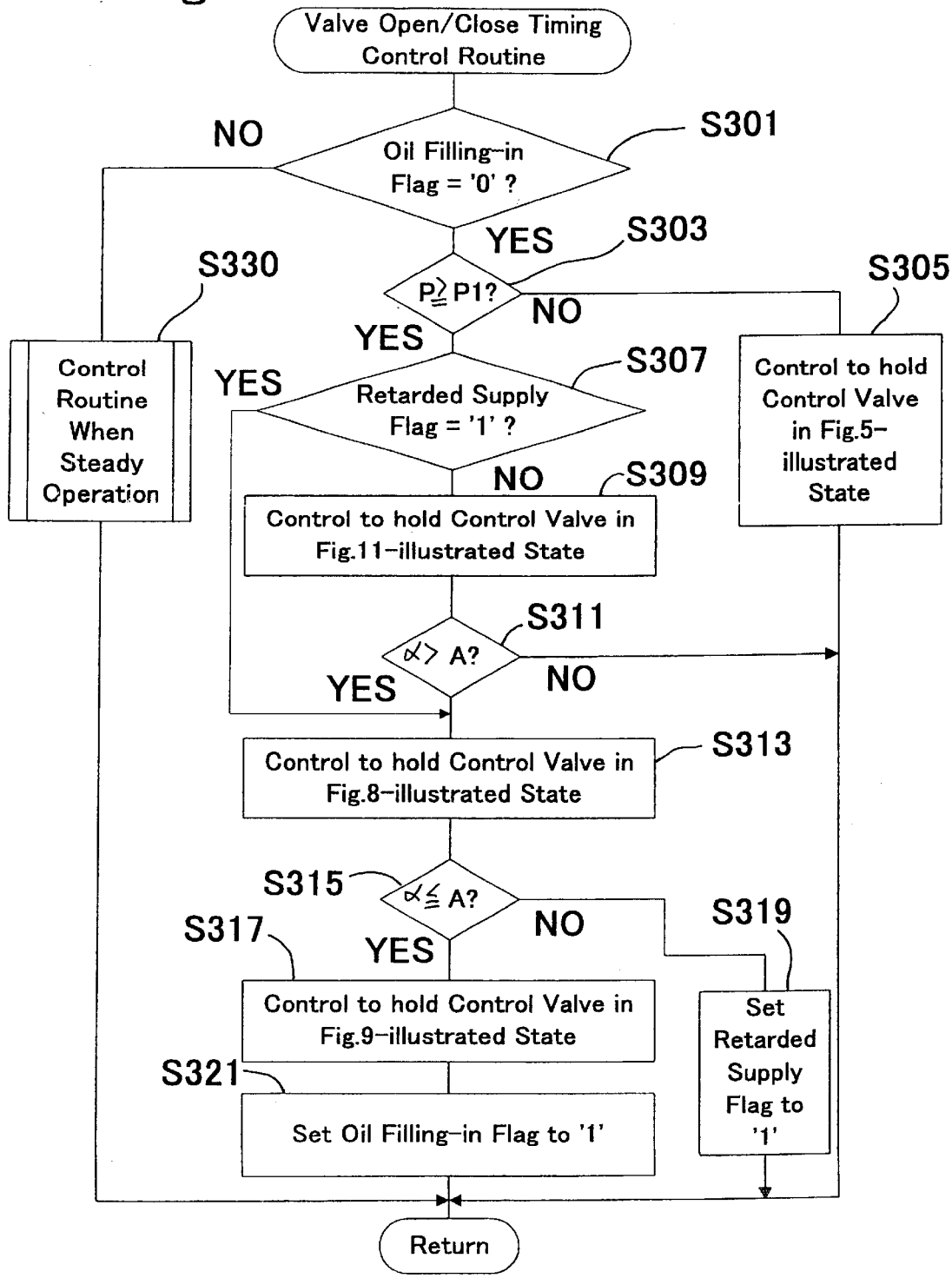
FIG. 12 is a flowchart which represents the valve open/close timing control of the variable valve timing system shown in FIG. 1.

In the present embodiment, upon initiation of operation of the internal combustion engine, the solenoid 103 of the hydraulic pressure control valve 100 is energized under the control of a control routine which is previously set by the energization controlling device 200 (using the valve open/close timing control routine shown in FIG. 12). In this valve open/close timing control routine, at an earlier stage of the internal combustion engine initiation or operation during which a hydraulic supply pressure P of the operation fluid discharged from the oil pump 110 (the oil pump discharging pressure) reaches a controllable hydraulic pressure P1, steps 301, 303 and 305 are executed in such order repeatedly to maintain the hydraulic pressure control valve 100 at a position shown in FIG. 5, whereby the operation fluid is discharged into the oil reservoir 120 from each of the advanced angle chambers R1, each of the retarded angle chambers R2, and the relative rotation controlling mechanism B in the hydraulic pressure circuit C. In step 301, it is determined whether or not an oil filling-up flag is '0' which is to be reset to '0' upon internal combustion engine initiation. In step 303, on the basis of the detection signal from the oil pump discharge pressure sensor 207, it is determined whether or not the hydraulic supply pressure P is equal to or greater than the controllable hydraulic pressure P1. In step 305, the solenoid 103 is energized by the duty value to make the hydraulic pressure control valve 100 at the illustrated state in FIG. 5.

Thus, at the earlier stage of the internal combustion engine initiation or operation, the operation fluid remaining in the advanced angle chambers R1 and the retarded angle chambers R2 can be discharged therefrom, which makes the relative rotation between the housing member 30 and the rotor member 20 free from such remaining operation fluid which may otherwise disturb such relative rotation. Thus, due to the torque variation in the driving force transmission system, the rotor member 20 can be rotated quickly relative to the housing member 30 into the lock phase position between the advanced angle position and the retarded angle position. In addition, at the earlier stage of the internal combustion engine initiation, the operation fluid can be discharged from the lock grooves 21f, 21g, thus making it possible to establish a correct lock operation (wherein the lock pins 61, 62 are urged by the respective lock springs 63, 64). As a result, the relative rotation between the housing member 30 and the rotor member 20 can be restricted correctly or precisely at the lock phase position. Thus, the starting ability of the internal combustion engine can be improved.

Moreover, at the later stage of the internal combustion engine initiation after the hydraulic supply pressure P discharged from the oil pump 110 becomes equal to or above the controllable pressure P1, until the relative rotation angle α between the housing member 30 and the rotor member 20, which is measured from the retarded position, exceeds a set value A which corresponds to the pre-set lock phase position (i.e. until the advanced angle chamber R1 is filled with the operation fluid which is at the side of excellent phase transfer response characteristics), steps 301, 303, 307, 309 and 311 are executed repeatedly. This causes the hydraulic pressure control valve 100 to be held at the illustrated state in FIG. 11 (or may be held alternatively at the illustrated state in FIG. 10). As a result, in the hydraulic pressure circuit C, the advanced angle chambers R1 and the arc-shape lock grooves 21f can be supplied with the operation fluid.

In step 307, it is determined whether or not a retarded angle supply flag is '1' which is to be reset to '0' by the initialization upon internal combustion engine initiation. In step 309, the solenoid 103 is energized by the duty value to cause the hydraulic pressure control valve 100 to be held in the illustrated state in FIG. 11. In step 311, it is determined whether or not the relative rotation angle α exceeds the set value A on the basis of detection signals from the respective crank angle sensor 201 and the cam angle sensor 202. It is to be noted that the set value A can be amended or corrected based on the actual relative rotation angle α of the intermediate phase angle when the hydraulic pressure control valve 100 is held in the state illustrated in FIG. 5. This makes it possible to compensate for instrument error.

When the relative rotation angle α exceeds the set value A, until the relative rotation angle α becomes equal to or less than the set value A (i.e. the retarded angle chambers R2 are filled with the operation fluid), steps 313, 315, 319, 301, 303 and 307 are executed repeatedly to supply the operation fluid to the retarded angle chambers R2 and the arc-shaped lock grooves 21g in the hydraulic pressure circuit C in such manner that the supplied operation fluid is capable of being locked in the advanced angle chamber R1, and the arc-shaped lock groove 21f of the relative rotation controlling mechanism B. In step 313, the solenoid 103 is energized by the duty value to cause the hydraulic pressure control valve 100 to be held in the illustrated state in FIG. 8. In step 315, it is determined whether or not the relative rotation angle α is lower than the set value A on the basis of detection signals from the respective crank angle sensor 201 and the cam angle sensor 202. In step 319, a retarded angle supply flag is set to '1.' It is to be noted that it is desirable to determine the aforementioned set value A in consideration of the system hysteresis for supplying the operation fluid in a correct or precise fashion.

Moreover, after the relative rotation angle becomes equal to or less than the set value A, until the internal combustion engine is terminated, steps 301 and 330 are executed repeatedly for performing the steady operation control routine after executing steps 317 and 321. In step 317, the solenoid 103 is energized by the duty value to cause the hydraulic pressure control valve 100 to be held in the illustrated state in FIG. 9. In step 321, the oil filling-up flag is set to '1.'

Thus, while the internal combustion engine transfers from its later stage of initiation to a steady operation stage, the relative rotation phase between the housing member 30 and the rotor member 20 can be substantially held in the aforementioned lock phase position. As a result, the relative rotation phase between the housing member 30 and the rotor member 20 can be made stable at the intermediate phase. In addition, switching from the operation fluid supply to the advanced angle chambers R1 to the operation fluid supply to the retarded angle chambers R2 is performed on the basis of the phase detection means (which is made up of the crank angle sensor 201 and the cam angle sensor 202), which makes it possible to establish the operating fluid supply switching action at the predetermined relative rotation phase, thereby continually ensuring the expected operation response characteristics.

In addition, in the present embodiment, while the internal combustion engine is in its steady operation stage, step 330 in FIG. 12 is executed to control the solenoid 103 of the hydraulic pressure control valve 100 by the control routine which is pre-set by the energization controlling device 200. This results in the rotation phase of the rotor member 20 relative to the housing member 30 being held in an arbitrary position between a position at which the relative rotation phase becomes the retarded angle phase (i.e. the volume of the advanced angle chamber R1 becomes the minimum, while the volume of the retarded angle chamber R2 becomes the maximum) and a position at which the relative rotation phase becomes the advanced angle phase (i.e. the volume of the advanced angle chamber R1 becomes the maximum, while the volume of the retarded angle chamber R2 becomes the minimum), thereby suitably adjusting the valve open/close timing of the intake valve between the retarded controlled state and the advanced controlled state.

In such a case, adjusting the rotation phase of the rotor member 20 relative to the housing member 30 in the direction of the advanced angle is performed such that the spool 104 of the hydraulic pressure control valve 100 is held in the illustrated state in FIG. 11, in which each advanced angle chamber R1 and the arc-shaped look groove 21f of the relative rotation controlling mechanism B is supplied with the operation fluid by way of the hydraulic pressure control valve 100, while the operation fluid is discharged from each of the retarded angle chambers R2 and the arc-shaped lock groove 21g of the relative rotation controlling mechanism B by way of the hydraulic pressure control valve 100.

At this time, the operation fluid is supplied to the arc-shaped lock groove 21f of the relative rotation controlling mechanism B, which results in: (1) the lock pin 61 being fitted in the retraction groove 32a in a retraction-fit state due to the unlock operation against the lock spring 63 or being brought into sliding engagement with the outer surface of the main rotor 21; and (2) the look pin 62 being brought into sliding engagement with the outer surface of the main rotor 21 and the lock pin 62 being slidably fitted in the arc-shaped look groove 21g, whereby the operation fluid is supplied to and discharged from the advanced angle chambers R1 and the retarded angle chambers R2, respectively, thereby rotating the rotor member 20 relative to the housing member 30 in the advanced angle direction.

On the other hand, the adjustment of the rotation phase of the rotor member 20 relative to the housing member 30 in the direction of retarded angle is performed such that the spool 104 of the hydraulic pressure control valve 100 is held in the state illustrated in FIG. 7 in which each of the advanced angle chambers R2 and the arc-shaped lock groove 21g of the relative rotation controlling mechanism B is supplied with the operation fluid by way of the hydraulic pressure control valve 100, while the operation fluid is discharged from each of the retarded angle chambers R1 and the arc-shaped lock groove 21f of the relative rotation controlling mechanism B by way of the hydraulic pressure control valve 100.

At this time, the operation fluid is supplied to the arc-shaped lock groove 21g of the relative rotation controlling mechanism B, which results in: (1) the lock pin 62 being fitted in the retraction groove 32b in a retraction-fit state due to the unlock operation against the look spring 64 or being brought into sliding engagement with the outer surface of the main rotor 21; and (2) the lock pin 61 being brought into sliding engagement with the outer surface of the main rotor 21 or the look pin 61 being slidably fitted in the arc-shaped lock groove 21f, whereby the operation fluid is supplied to and discharged from the retarded angle chambers R1 and the advanced angle chambers R2, respectively, thereby rotating the rotor member 20 relative to the housing member 30 in the retarded angle direction.

When the described embodiment is put into practice, if the energization duty value (i.e., the control value) of the hydraulic pressure control valve which serves for holding the phase during steady operation of the internal combustion engine before the internal combustion engine is terminated is made amended or changed on the basis of the temperature of the operation fluid during execution of step 309 in FIG. 12, compensation can be made for instrumental errors and deteriorations over time. This makes it possible to provide constant operation fluid supply characteristics, thereby obtaining a specified operation response characteristic. In such a case, if the energization duty value (i.e., the control value) is amended, changed or updated based on the temperature of the operation fluid which is represented by the detection signal from the engine cooling water temperature sensor 205 in order that the opening area of the hydraulic pressure control valve is made smaller (larger) due to a lower (higher) viscosity of the operation fluid when the temperature of the operation fluid is high (low), this makes it possible to provide constant operation fluid supply characteristics freely from the temperature of the operation fluid, thereby obtaining a specified operation response characteristic.

When the present embodiment is put into practice, if a decision (corresponding to step 303 in FIG. 12) is made whether or not the discharged pressure P of the fluid from the oil pump (i.e. the pressure of the operation fluid) reaches the controllable pressure after a time duration elapses as measured from the initiation of operation of the internal combustion engine (i.e. a pre-measured time duration from initiation of the internal combustion engine to a time when the discharge pressure P of the oil pump 110 driven by the initiated internal combustion engine becomes equal to or above the controllable hydraulic pressure P1), it is possible to detect whether or not the pressure of the operation fluid reaches the controllable pressure without using a specially prepared hydraulic pressure detecting means such as the aforementioned oil pump discharge pressure sensor 207, thus reducing the cost. In such a case, by making the time duration longer (shorter) when the temperature of the operation is low (high) or when the revolution number of the internal combustion engine is high (low), it is possible to provide constant operation fluid supply characteristics freely from the temperature of the operation fluid, thereby obtaining a specified operation response characteristic.

In the present embodiment, the relative rotation controlling mechanism B comprises the first control mechanism which includes the lock pin 61 and the lock spring 63 for restricting the relative rotation in the advancing angle direction upon lock operation at the lock phase position and the second control mechanism which includes the lock pin 62 and the lock spring 64 for restricting the relative rotation in the retarded angle direction upon lock operation at the lock phase position, thus allowing the operation fluid to flow between the hydraulic pressure circuit C and the advanced angle chamber R1 by way of the first control mechanism while also allowing the operation fluid to flow between the hydraulic pressure circuit C and the retarded angle chamber R2 by way of the second control mechanism. As a result, the hydraulic pressure circuit C is capable of being configured to establish control of the operation fluid by the sole hydraulic pressure control valve 100.

Thus, a portion of a flow passage of the operation fluid which extends from the hydraulic pressure circuit C to the advanced angle chamber R1 can be used as a flow passage of the operation fluid which extends from the hydraulic pressure circuit C to the first control mechanism, while a portion of a flow passage of the operation fluid which extends from the hydraulic pressure circuit C to the retarded angle chamber R2 can be used as a flow passage of the operation fluid which extends from the hydraulic pressure circuit to the second control mechanism. Thus, the load for producing the passage can be reduced. Accordingly, the hydraulic pressure circuit C can be made much simpler, which means that the hydraulic pressure circuit C can be produced in a much smaller size and at a lower cost.

Moreover, in the described embodiment, in addition to the hydraulic pressure control valve 100 being capable of: (1) discharging the operation fluid from the advanced and retarded angle chambers when the duty value is 0% (i.e. the control current value is zero) as shown in FIG. 5; (2) discharging the operation fluid from the advanced angle chamber R1 and supplying the operation fluid to the retarded angle chamber R2 when the control current value is at its low level as shown in FIG. 7, (3) interrupting the operation fluid supply to and the operation fluid discharge from each of the advanced angle chamber and the retarded angle chamber when the control current value is at its intermediate level as shown in FIG. 9; and (4) supplying the operation fluid to the advanced angle chamber R1 and discharging the operation fluid from the retarded angle chamber R2 when the control current value is ai its high level as shown in FIG. 11, the control current value is made high from zero or the minimized level in a relatively short time duration (required for executing steps 307 and 309 in FIG. 12) measured from when the pressure of the operation fluid becomes equal or greater than the value of the controllable pressure P1.

Thus, when the control current shifts from zero or the minimized level (under which the operation fluid can be discharged from the advanced angle chamber R1 and retarded angle chamber R2) to the high level (under which the operation fluid can be supplied to one of the advanced angle chambers R1 and the retarded angle chamber R2 which is at a superior side of the phase transfer response characteristic, while the operation fluid can be discharged from the other), the time required for such a shift can be reduced or minimized.

Moreover, at a time when the pressure of the operation fluid becomes equal to or greater than the controllable pressure value P1, the state under which the advanced angle chamber R1, the retarded angle chamber R2, and the relative rotation controlling mechanism B are ready for discharging the operation fluid is shifted to the state under which the advanced angle chamber R1 and the retarded angle chamber R2 are ready for discharging and being supplied with the operation fluid at the high level of the control current value, the control current value is made temporally high such that thereafter the control current value is controlled to the predetermined value, resulting in that for example when the spool 104 is shifted to a position at which the operation fluid cannot be supplied to and discharged from each of the advanced angle chamber R1 and the retarded angle chamber R2 or the operation fluid can be discharged from the retarded angle chamber R2 and supplied to the advanced angle chamber R1, the time duration can be reduced or minimized under which the spool 104 enables and non-enables the operation fluid to be supplied to the retarded angle chamber R2 and to be discharged from the advance angle chamber R1, respectively.

As a result, even though at the time when the pressure of the operation fluid becomes equal to or greater than the controllable pressure value P1 the operation fluid remains in the advanced angle chamber R1 and the retarded angle chamber R2 and for example the retarded angle chamber R2 is supplied with the operation fluid under the condition that the control current value is at a low level temporally while the control current value shifts from zero or a minimized level to a high level as shown in FIG. 7, due to the fact that the state in which the control current value is at a low level temporally lasts for a very small time duration and the amount of the operation fluid supplied to the retarded angle chamber R2 is very small, the lock pin 62 (i.e., the second control mechanism) does not perform the unlock operation. In the aforementioned temporal period, for example, if the amount of the operation fluid supplied to the retarded angle chamber R2 is large (i.e. the time duration is long during which the FIG. 7 illustrated state is held), the supplied operation fluid is added to the remaining operation fluid in the retarded angle chamber R2, which may make the relative rotation phase between the housing member 30 and the rotor member 20 temporally unstable due to the unlock operation of the lock pin 62 (the second control mechanism).

Figure 13:
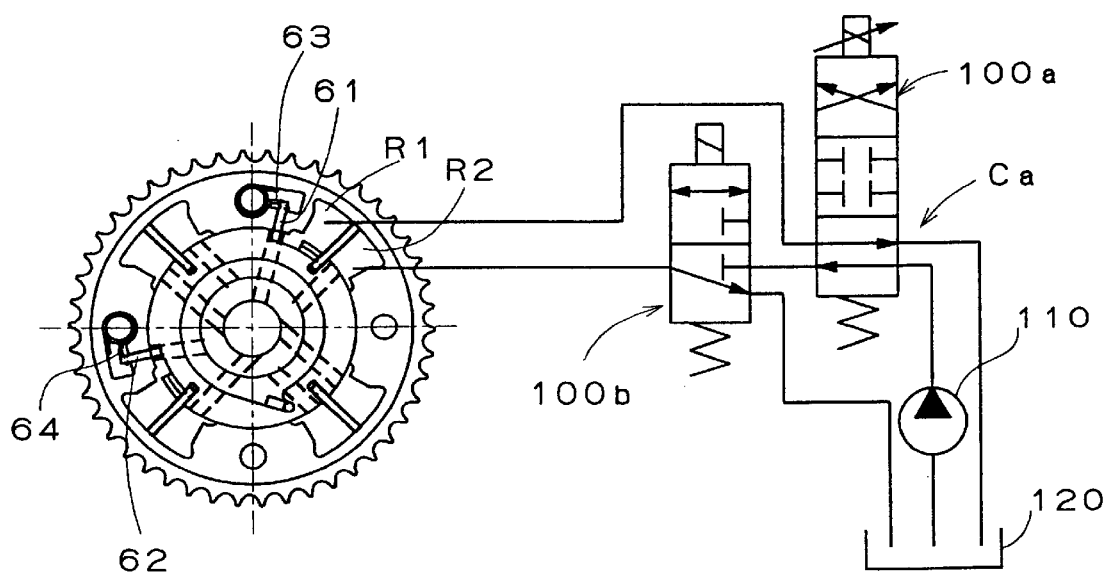
FIG. 13 is a schematic view of a variable valve timing system according to another embodiment of the present invention.

In the present invention, in the hydraulic pressure control circuit C which includes only the one hydraulic pressure control valve 100, the operation fluid is supplied to and is discharged from each of the advance angle chambers R1, the retarded angle chambers R2, and the relative rotation controlling mechanism B. As an alternative, as shown in FIG. 13, a hydraulic pressure control circuit Ca can include a set of two hydraulic pressure control valves 100a, 100b, and the operation fluid can be also supplied to and discharged from each of the advance angle chambers R1, the retarded angle chambers R2, and the relative rotation controlling mechanism B. In the FIG. 13 illustrated relative rotation controlling mechanism, each of the lock pins 61, 62 (lock plates could alternatively be used) is assembled in a radially extending retracting bore formed in the housing member 31 so as to be slidable in the axial direction in such a manner that the lock pins 61, 62 are urged to project from the retracting bore by the springs 63, 64 accommodated in the retracting bore. The relative rotation controlling mechanism illustrated in FIG. 13 can be used as an alternative to the relative rotation controlling mechanism B illustrated in FIGS. 1–12.

As described above, the housing member 30 rotates as one unit with the crankshaft and the rotor member 20 rotates as one unit with the camshaft 10. However, the present invention can be used for other types of variable valve timing system in which the housing member rotates in one unit with the camshaft and the rotor member rotates as one unit with the crankshaft. The present invention can also be used for variable valve timing systems in which the vane is formed as one unit with the rotor body.

Although the present invention as described above is applied to a variable valve timing system equipped on the camshaft for controlling the opening and closing of the intake valve, the present invention can also be applied, as it is or by being suitably modified, to other variable valve timing systems equipped on the camshaft for controlling the opening and closing of the exhaust valve. In the variable valve timing system equipped on the camshaft for controlling the opening and closing of the exhaust valve, sometimes the urging force of the torsion spring may be increased for assisting the rotor member to rotate toward the advanced angle side relative to the housing member 30. In such a structure, due to the fact that the direction which is superior in phase transfer response characteristics is in coincidence with the advanced angle direction, after the pressure of the operation fluid becomes equal to or above the controllable pressure value during the internal combustion engine initiation, the operation fluid fills the retarded angle chamber prior to filling the operation fluid in the advanced angle chambers R1.

As an alternative to the aforementioned hydraulic pressure control valve 100, it is possible to employ a hydraulic pressure control valve which is capable of: (1) discharging the operation fluid from the relative rotation controlling mechanism and both the advanced and retarded angle chambers when a control current value is at its high lever; (2) discharging the operation fluid from one of the advanced and retarded angle chambers and supplying the operation fluid to the other when the control current value is at its intermediate level; (3) interrupting the operation fluid supply to and the operation fluid discharge from each of the advanced angle chamber and the retarded angle chamber when the control current value is at its low level; and (4) supplying the operation fluid to one of the advanced and retarded angle chambers and discharging the operation fluid from the other when the control current value is zero or at a minimized level.

In such a case, the aforementioned advantages can be provided by making the control current value at its zero or minimized level temporally such that thereafter the control current value is controlled to a predetermined control current value after the pressure of the operation fluid becomes equal to or above the value of the controllable pressure, when a transfer is made from a state which makes it possible to discharge the operation fluid from the relative rotation controlling mechanism and the advanced and retarded angle chambers to another state which makes it impossible to supply the operation fluid to and discharge the operation fluid from each of the advanced and retarded angle chambers or which makes it possible to discharge the operation fluid from one of the advanced and retarded angle chambers and supply the operation fluid to the other of the advanced and retarded angle chambers.

The principles, preferred embodiments and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A variable valve timing system comprising:
    a housing member provided in a driving force transmitting system in which is transmitted a driving force from a crankshaft of an internal combustion engine to a camshaft for controlling opening/closing of one of an intake valve and an exhaust valve of the internal combustion engine;
    the housing member rotating together with one of the crankshaft and the camshaft;
    a rotor member relatively rotatably assembled on a shoe portion provided on the housing member and forming an advanced angle chamber and a retarded angle chamber at a vane portion in the housing member;
    the rotor member rotating together with the other of the camshaft and the crankshaft;
    a relative rotation controlling mechanism which, upon unlock operation established by being supplied with an operation fluid, allows relative rotation between the housing member and the rotor member and which, upon lock operation established by discharge of the operation fluid, restricts the relative rotation between the housing member and the rotor member at a lock phase position in an intermediate region located at a position other than rotation limit ends corresponding to advanced and retarded angle phase positions, respectively; and
    a hydraulic pressure circuit for controlling the operation fluid supply and discharge for the relative rotation controlling mechanism as well as for controlling the operation fluid supply and discharge of each of the advanced angle chamber and the retarded angle chamber;
    the hydraulic pressure circuit, upon initiation of the internal combustion engine, discharging the operation fluid from the relative rotation controlling mechanism and the advanced and retarded angle chambers until a pressure of the operation fluid reaches a controllable pressure value;
    the hydraulic pressure circuit being adapted, after the pressure of the operation fluid reaches the controllable pressure value, to effect filling of one of the advanced and retarded angle chambers which is at a superior side of in phase transfer response characteristics with the operation fluid, and to subsequently effect filling of the other of the advanced and retarded angle chambers with operation fluid, the hydraulic pressure circuit being adapted to supply the operation fluid to the relative rotation controlling mechanism.

2. The variable valve timing system as set forth in claim 1, wherein the hydraulic pressure circuit includes a hydraulic pressure control valve, with a control value of the hydraulic pressure control valve being updated, when effecting filling of one of the advanced and retarded angle chambers which is at the superior side of in phase transfer response characteristics, based on the control value for retaining a phase of the relative rotation controlling mechanism while the internal combustion engine is in a steady operation stage before the internal combustion engine is terminated.

3. The variable valve timing system as set forth in claim 2, wherein the control value of the hydraulic pressure control valve is updated based on a temperature of the operation fluid.

4. The variable valve timing system as set forth in claim 1, wherein after elapse of a time duration measured from initiation of the internal combustion engine a decision is made whether or not the pressure of the operation fluid has reached the controllable pressure.

5. The variable valve timing system as set forth in claim 4, wherein the elapse of the time duration is changed depending on a temperature of the operation fluid or a number of revolutions of the internal combustion engine.

6. The variable valve timing system as set forth in claim 1, wherein switching the supply of the operation fluid from one of the advanced and retarded angle chambers which is at the superior side of in phase transfer response characteristics to the other of the advanced and retarded angle chambers is established based on a detected value derived from a phase detection means.

7. A variable valve timing system as set forth in claim 6, wherein the relative rotation controlling mechanism is made up of a first control mechanism and a second control mechanism, the first control mechanism restricting the relative rotation in an advancing angle direction upon lock operation at the lock phase position, the second control mechanism restricting the relative rotation in a retarding angle direction upon lock operation at the lock phase position, the operation fluid being permitted to flow between the hydraulic pressure circuit and the advanced angle chamber by way of the first control mechanism and being permitted to flow between the hydraulic pressure circuit and the retarded angle chamber by way of the second control mechanism, the hydraulic pressure circuit controlling the operation fluid by a sole hydraulic pressure control valve.

8. The variable valve timing system as set forth in claim 7, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers which is at the superior side of in phase transfer response and supply the operation fluid to the other of the advanced and retarded angle chambers when the control current value is at a low level; (3) interrupt the operation fluid supply to and the operation fluid discharge from each of the advanced angle chamber and the retarded angle chamber when the control current value is at an intermediate level; and (4) supply the operation fluid to one of the advanced and retarded angle chambers which is at the superior side of in phase transfer response and discharge the operation fluid from the other of the advanced and retarded angle chambers when the control current value is at a high level, the control current value being changed to the high level from zero or the minimized level in a relatively short time duration measured from a time when the pressure of the operation fluid becomes equal to or greater than the value of the controllable pressure.

9. The variable valve timing system as set forth in claim 7, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers and supply the operation fluid to the other of the advanced and retarded angle chambers when the control current value is at a low level; (3) interrupts the operation fluid supply to and the operation fluid discharge from each of the advanced angle chamber and the retarded angle chamber when the control current value is at an intermediate level; and (4) supplies the operation fluid to one of the advanced and retarded angle chambers and discharges the operation fluid from the other of the advanced and retarded angle chambers when the control current value is at a high level, the control current value being set at the high level temporarily such that thereafter the control current value is controlled to a predetermined control current value after the pressure of the operation fluid becomes equal to or greater than the value of the controllable pressure, when a transfer is made from a first condition to one of a second condition and a third condition, the first condition permitting discharge of the operation fluid from the relative rotation controlling mechanism and the advanced and retarded angle chambers, the second condition preventing supply of the operation fluid to and discharge of the operation fluid from each of the advanced and retarded angle chambers, the third condition permitting discharge of the operation fluid from one of the advanced and retarded angle chambers and supply of the operation fluid to the other of the advanced and retarded angle chambers.

10. The variable valve timing system as set forth in claim 6, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers which is at the superior side of in phase transfer response and supply the operation fluid to the other of the advanced and retarded angle chambers when the control current value is at a low level; (3) interrupt the operation fluid supply to and the operation fluid discharge from each of the advanced angle chamber and the retarded angle chamber when the control current value is at an intermediate level; and (4) supply the operation fluid to one of the advanced and retarded angle chambers which is at the superior side of in phase transfer response and discharge the operation fluid from the other of the advanced and retarded angle chambers when the control current value is at a high level, the control current value being changed to the high level from zero or the minimized level in a relatively short time duration measured from a time when the pressure of the operation fluid becomes equal to or greater than the value of the controllable pressure.

11. The variable valve timing system as set forth in claim 6, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers and supply the operation fluid to the other of the advanced and retarded angle chambers when the control current value is at a low level; (3) interrupts the operation fluid supply to and the operation fluid discharge from each of the advanced angle chamber and the retarded angle chamber when the control current value is at an intermediate level; and (4) supplies the operation fluid to one of the advanced and retarded angle chambers and discharges the operation fluid from the other of the advanced and retarded angle chambers when the control current value is at a high level, the control current value being set at the high level temporarily such that thereafter the control current value is controlled to a predetermined control current value after the pressure of the operation fluid becomes equal to or greater than the value of the controllable pressure, when a transfer is made from a first condition to one of a second condition and a third condition, the first condition permitting discharge of the operation fluid from the relative rotation controlling mechanism and the advanced and retarded angle chambers, the second condition preventing supply of the operation fluid to and discharge of the operation fluid from each of the advanced and retarded angle chambers, the third condition permitting discharge of the operation fluid from one of the advanced and retarded angle chambers and supply of the operation fluid to the other of the advanced and retarded angle chambers.

12. A variable valve timing system as set forth in claim 1, wherein the relative rotation controlling mechanism is made up of a first control mechanism and a second control mechanism, the first control mechanism restricting the relative rotation in an advancing angle direction upon lock operation at the lock phase position, the second control mechanism restricting the relative rotation in a retarding angle direction upon lock operation at the lock phase position, the operation fluid being permitted to flow between the hydraulic pressure circuit and the advanced angle chamber by way of the first control mechanism and being permitted to flow between the hydraulic pressure circuit and the retarded angle chamber by way of the second control mechanism, the hydraulic pressure circuit controlling the operation fluid by a sole hydraulic pressure control valve.

13. The variable valve timing system as set forth in claim 12, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers which is at the superior side of in phase transfer response and supply the operation fluid to the other of the advanced and retarded angle chambers when the control current value is at a low level; (3) interrupt the operation fluid supply to and the operation fluid discharge from each of the advanced angle chamber and the retarded angle chamber when the control current value is at an intermediate level; and (4) supply the operation fluid to one of the advanced and retarded angle chambers which is at the superior side of in phase transfer response and discharge the operation fluid from the other of the advanced and retarded angle chambers when the control current value is at a high level, the control current value being changed to the high level from zero or the minimized level in a relatively short time duration measured from a time when the pressure of the operation fluid becomes equal to or greater than the value of the controllable pressure.

14. The variable valve timing system as set forth in claim 12, wherein the hydraulic pressure control valve is adapted to: (1) discharge the operation fluid from the relative rotation controlling mechanism and the advanced and retarded angle chambers when a control current value is zero or at a minimized level; (2) discharge the operation fluid from one of the advanced and retarded angle chambers and supply the operation fluid to the other of the advanced and retarded angle chambers when the control current value is at a low level; (3) interrupts the operation fluid supply to and the operation fluid discharge from each of the advanced angle chamber and the retarded angle chamber when the control current value is at an intermediate level; and (4) supplies the operation fluid to one of the advanced and retarded angle chambers and discharges the operation fluid from the other of the advanced and retarded angle chambers when the control current value is at a high level, the control current value being set at the high level temporarily such that thereafter the control current value is controlled to a predetermined control current value after the pressure of the operation fluid becomes equal to or greater than the value of the controllable pressure, when a transfer is made from a first condition to one of a second condition and a third condition, the first condition permitting discharge of the operation fluid from the relative rotation controlling mechanism and the advanced and retarded angle chambers, the second condition preventing supply of the operation fluid to and discharge of the operation fluid from each of the advanced and retarded angle chambers, the third condition permitting discharge of the operation fluid from one of the advanced and retarded angle chambers and supply of the operation fluid to the other of the advanced and retarded angle chambers.

* * * * *